United States Patent
Keaton et al.

(10) Patent No.: US 12,497,471 B2
(45) Date of Patent: *Dec. 16, 2025

(54) ALKENE FUNCTIONALIZED ACTIVATORS AND THEIR USE IN ELECTRICAL APPLICATIONS

(71) Applicants: DOW GLOBAL TECHNOLOGIES LLC, Midland, MI (US); THE TEXAS A&M UNIVERSITY SYSTEM, College Station, TX (US)

(72) Inventors: Richard J. Keaton, Lake Jackson, TX (US); Oleg V. Ozerov, College Station, TX (US); Qingheng Lai, College Station, TX (US); Jerzy Klosin, Midland, MI (US); Michael J. Lesniak, Midland, MI (US); David M. Pearson, Lake Jackson, TX (US); Todd D. Senecal, Midland, MI (US); William H. H. Woodward, Midland, MI (US); Sukrit Mukhopadhyay, Midland, MI (US); John R. Stutzman, Midland, MI (US); Susan O. Gunther, College Station, TX (US)

(73) Assignees: Dow Global Technologies LLC, Midland, MI (US); The Texas A&M University System, College Station, TX (US)

( * ) Notice: Subject to any disclaimer, the term of this patent is extended or adjusted under 35 U.S.C. 154(b) by 1084 days.

This patent is subject to a terminal disclaimer.

(21) Appl. No.: 17/607,638

(22) PCT Filed: Apr. 30, 2020

(86) PCT No.: PCT/US2020/030724
§ 371 (c)(1),
(2) Date: Oct. 29, 2021

(87) PCT Pub. No.: WO2020/223488
PCT Pub. Date: Nov. 5, 2020

(65) Prior Publication Data
US 2023/0183401 A1    Jun. 15, 2023

Related U.S. Application Data

(60) Provisional application No. 62/840,887, filed on Apr. 30, 2019.

(51) Int. Cl.
| | | |
|---|---|---|
| C08F 4/52 | (2006.01) |
| C08F 4/659 | (2006.01) |
| C08F 4/6592 | (2006.01) |
| C08F 30/06 | (2006.01) |
| C08F 130/06 | (2006.01) |
| C08F 210/16 | (2006.01) |
| C08F 230/06 | (2006.01) |

(52) U.S. Cl.
CPC ........ *C08F 210/16* (2013.01); *C08F 4/65908* (2013.01); *C08F 4/6592* (2013.01)

(58) Field of Classification Search
CPC .......... C08F 4/52; C08F 30/06; C08F 130/06; C08F 230/06; C08F 230/065
See application file for complete search history.

(56) References Cited

U.S. PATENT DOCUMENTS

| | | |
|---|---|---|
| 5,427,991 A | 6/1995 | Turner |
| 6,465,385 B1 | 10/2002 | Sivak et al. |
| 6,777,509 B2 | 8/2004 | Brown et al. |
| 6,869,904 B2 | 3/2005 | Boussie et al. |
| 6,900,321 B2 | 5/2005 | Boussie et al. |
| 6,953,764 B2 | 10/2005 | Frazier et al. |
| 7,650,930 B2 | 1/2010 | Cheluget et al. |
| 8,372,927 B2 | 2/2013 | Figueroa et al. |
| 9,618,665 B2 | 4/2017 | Ito et al. |
| 11,572,375 B2 * | 2/2023 | Klosin ...................... C07F 5/05 |
| 2009/0018298 A1 * | 1/2009 | Michl ...................... C08F 4/484 |
| | | 526/329 |

FOREIGN PATENT DOCUMENTS

| | | | |
|---|---|---|---|
| CN | 104610334 A * | 5/2015 | ............... C07F 5/05 |
| CN | 105399885 A | 3/2016 | |
| EP | 0710663 A1 | 5/1996 | |
| JP | H08-127611 A | 5/1996 | |
| JP | HII-286491 A | 10/1999 | |
| WO | 93/11172 A1 | 6/1993 | |
| WO | 99/41294 A1 | 8/1999 | |
| WO | 2007136496 A3 | 11/2007 | |

(Continued)

OTHER PUBLICATIONS

Machine translation of CN-104610334-A (no date).*
Japanese Office Action dated Apr. 9, 2024, pertaining to JP Patent Application No. 2021-564842, 17 pgs.
Communication pursuant to Article 94(3) EPC dated Nov. 27, 2024, pertaining to EP Patent Application No. 20727478.8, 9 pgs.
Alanazi, Synthesis, preformulation and liposomal formulation of cholesteryl carborane esters with various fatty chains. Int. J. Pharm. 2003, 189-197, 255.
Fete, HCB11(CF3)nF11-n-: Inert Anions with High Anodic Oxidation Potentials, Journal of the American Chemical Society, 2011, 4123-4131,133.

(Continued)

*Primary Examiner* — Michael J Feely
(74) *Attorney, Agent, or Firm* — Dinsmore & Shohl LLP

(57) ABSTRACT

Processes of polymerizing polyolefins and synthesis of activators. The polymerization processes include polymerizing one or more $(C_2-C_{12})\alpha$-olefin monomers in the presence of at least one catalyst and at least one co-catalyst to produce a polyolefin. The co-catalyst includes a cation and an anion, in which the anion has a structure having a vinyl terminated alkene, one boron atom or more than one boron atoms, and at least four halogen atoms. The anion of the co-catalysts is incorporated into a polymer chain of the polyolefin.

15 Claims, 9 Drawing Sheets

(56) References Cited

FOREIGN PATENT DOCUMENTS

| WO | 2010022228 | A2 | | 2/2010 | |
|---|---|---|---|---|---|
| WO | 2011102989 | A1 | | 8/2011 | |
| WO | 2017173080 | A1 | | 10/2017 | |
| WO | WO-2019089715 | A1 | * | 5/2019 | ............... C07F 5/05 |

OTHER PUBLICATIONS

Nava, High Yield C-Derivatization of Weakly Coordinating Carborane Anions, Inorganic Chemistry, 2010, 4726-4728, 49.

Vyakaranam, A New Type of Intermediate, C+(BCH3)11- ↔ C(BCH3)11, in a Grob Fragmentation Coupled with Intramolecular Hydride Transfer. A Nonclassical Carbocation Ylide or a Carbenoid? Journal of American Chemistry Society, 2004, 15795-15801, 126.

International Preliminary Report on Patentability EP PCT/US2020/030724 issued Nov. 2, 2021.

Communication Rule 161/162 EP Patent Application No. 20727478.8 Issued Dec. 14, 2021.

Vyakaranam, Kamesh, et al., "Air-Initiated Radical Polymerization of Lithium Salts of ω-(Undecamethylcarba-closo-dodecaboran-1'-yl)alk-1-enes, CH2=CH(CH2)n-2C(BMe)11-Li+", JACS Articles, vol. 128, pp. 5680-5686 (2006).

International Search Report and Written Opinion issued by the European Patent Office acting as International Searching Authority for International Patent Application No. PCT/US2020/030724 dated Aug. 6, 2020 (42 total pages).

Singapore Office Action dated Sep. 21, 2023, pertaining to SG Patent Application No. 11202111068W, 7 pgs.

Brazilian Office Action dated Sep. 13, 2023, pertaining to Brazilian Patent Application No. BR112021021366-0, 10 pgs.

Japanese Office Action dated Oct. 8, 2024, pertaining to JP Patent Application No. 2021-564842, 6 pgs.

Korean Office Action dated Mar. 10, 2025, pertaining to KR Patent Application No. 10-2021-7038665, 16 pgs.

* cited by examiner

ALKENE FUNCTIONALIZED ACTIVATORS AND THEIR USE IN ELECTRICAL APPLICATIONS

CROSS REFERENCE TO RELATED APPLICATIONS

This application claims priority to U.S. Provisional Patent Application No. 62/840,887, filed on Apr. 30, 2019, the entire disclosure of which is hereby incorporated by reference.

TECHNICAL FIELD

Embodiments of the present disclosure generally relate to alkene functionalized activators, the synthesis of the activators, and their application olefin polymerization processes.

BACKGROUND

Olefin-based polymers such as ethylene-based polymers and propylene-based polymers are produced via various catalyst systems. Selection of such catalyst systems can be an important factor contributing to the characteristics and properties of olefin-based polymers. The catalyst systems for producing polyethylene-based polymers may include a chromium-based catalyst system, a Ziegler-Natta catalyst system, or a molecular (either metallocene or non-metallocene) catalyst system.

Activators are typically used in conjunction with a metal procatalyst to form an activated catalyst ion pair that is subsequently used in the polymerization of olefins. As part of the catalyst composition in α-olefin polymerization reactions, the activator may have characteristics that are beneficial for the production of the α-olefin polymer and for final polymer compositions including the α-olefin polymer. Activator characteristics that increase the production of α-olefin polymers include, but are not limited to: rapid procatalyst activation, high catalyst efficiency, high temperature capability, consistent polymer composition, and selective deactivation.

As part of the catalyst system, the molecular polymerization procatalyst is activated to generate the catalytically active species for polymerization, and this can be achieved by any number of means. One such method employs an activator or co-catalyst that is a Brønsted acid. Brønsted acid salts containing weakly coordinating anions are commonly utilized to activate molecular polymerization procatalysts, particularly such procatalysts comprising Group IV metal complexes. Brønsted acid salts that are fully ionized are capable of transferring a proton to form a cationic derivative of such Group IV metal complexes.

For activators such as Brønsted acid salts, the cationic component may include cations capable of transferring a hydrogen ion such as ammonium, sulfonium, or phosphonium for example; or oxidizing cations such as ferrocenium, silver (I), or lead (II) cations, for example; or highly Lewis acidic cations such as carbonium or silylium, for example.

However, once the cations of the activator or co-catalyst activate the procatalyst, the activators may remain in the polymer composition. As a result, the cations and anions may affect the polymer composition. Since not all ions diffuse equally, different ions affect the polymer composition differently. In particular, the size of the ion, the charge of the ion, the interaction of the ion with the surrounding medium, and the dissociation energy of the ion with available counterions will affect the ion's ability to diffuse through a surrounding medium such as a solvent, a gel, or a polymer material.

Conventional olefin polymerization activators include weakly-coordinating or non-coordinating anions. It has been shown that weak coordination of the anion leads to increased catalytic efficiency of the cationic catalyst. However, since the non-nucleophilic character of the non-coordinating anion also increases diffusion, the residual activator anion in the produced polymer will lower the electrical resistance of the polymer, thereby increasing electrical loss, and thereby decreasing the insulation ability of the produced polymer.

SUMMARY

Ongoing needs exist to create activators or co-catalysts that do not diffuse or negatively affect the polymeric properties of the produced polymer while maintaining the catalytic efficiency of a weakly-coordinating anion. Embodiments of disclosure include polymerization processes. In one or more embodiments, the polymerization process includes polymerizing one or more $(C_2-C_{12})\alpha$-olefin monomers in the presence of at least one catalyst and at least one co-catalyst to produce a polyolefin and then inserting the anion of the co-catalyst into a polymer chain of the polyolefin. The polyolefin comprises (1) greater than 0 mole percent and less than 1 mole % of the anion of the co-catalyst of the total molar percent of the polyolefin, and (2) a density in the range from 0.853 to 0.920 g/cm$^3$.

The co-catalyst includes a cation and an anion. The anion has a structure that includes one vinyl terminated alkene, one boron atom or more than one boron atoms, and at least four halogen atoms.

In embodiments, the polymer process includes polymerizing one or more $(C_2-C_{12})\alpha$-olefin monomers in the presence of at least one catalyst and at least one co-catalyst to produce a polyolefin. Then, the anion of the co-catalyst is inserted into a polymer chain of the polyolefin.

The co-catalyst comprises a cation and an anion, the anion has a structure according to formula (I):

In formula (I), R$^1$ is an unsaturated $(C_2-C_{20})$hydrocarbyl having a vinyl terminated alkene; and X is a halogen selected from the groups consisting of fluorine, chlorine, bromine, and iodine.

In one or more embodiments, the polyolefin has a dissipation factor less than that of a corresponding polyolefin composition produced under identical polymeric conditions except the molar amount of the anion of formula (I) is replaced by an identical molar amount of a comparative anion having the formula (Ia):

(Ia)

In some embodiments, the polymerization process includes copolymerizing ethylene monomer and one or more $(C_3-C_{12})\alpha$-olefin monomers in the presence of at least one catalyst and at least one co-catalyst to produce a polyolefin. The anion of the co-catalyst is inserted into a polymer chain of the polyolefin. The polyolefin comprises greater than 0 mole percent and less than 1 mole percent of the anion of the co-catalyst based on the molar composition of the polyolefin.

The co-catalyst comprises a cation and an anion, the anion according to formula (II):

$$^-BR^2R^3R^4R^5 \qquad (II)$$

In formula (II), $R^2$, $R^3$, $R^4$ and $R^5$ are independently chosen from $(C_1-C_{40})$hydrocarbyl. Each $(C_1-C_{40})$hydrocarbyl is substituted with at least one halogen, and at least one $(C_1-C_{40})$hydrocarbyl is substituted with a vinyl terminated alkene.

DETAILED DESCRIPTION

Figure 1:
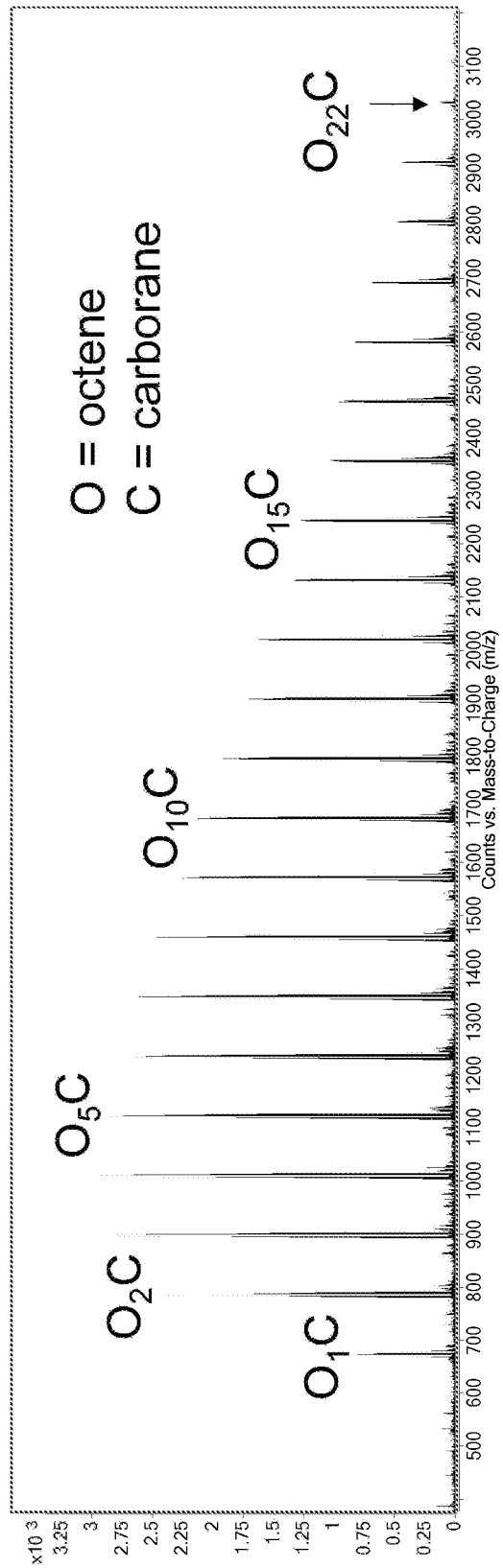
FIG. 1 is a negative mode mass spectrum from the flow injection analysis of the polyoctene produced from procatalyst P1 and olefin-substituted carborane activator Co-cat. 5.

The term "polyolefin" refers to a polymeric compound prepared by polymerizing α-olefins, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50 mole percent (mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

Embodiments of disclosure include polymerization processes. In one or more embodiments, the polymerization process includes polymerizing one or more $(C_2-C_{12})\alpha$-olefin monomers in the presence of at least one catalyst and at least one co-catalyst to produce a polyolefin. The co-catalyst has an anion and a cation. The cation of the co-catalyst is inserted into a polymer chain of the polyolefin. The anion of the co-catalysts has a structure that includes a vinyl terminated alkene, one boron atom or more than one boron atoms, and at least four halogen atoms. In some embodiments, the anion of the co-catalyst has two vinyl terminated alkene groups. In some embodiments, the polymerization process includes two co-catalysts, in which both co-catalysts have an anion having a structure that includes one vinyl terminated alkene, one boron atom or more than one boron atoms, and at least four halogen atoms.

The term "vinyl terminated alkene" refers to the placement of a double bond on a hydrocarbon. The vinyl terminated alkene is a terminal double bond, for example, $R^E HC=CH_2$, in which $R^E$ is a hydrocarbyl.

Scheme 1: Illustration of the anion being inserted or covalently incorporated into the polymer chain of the polyolefin.

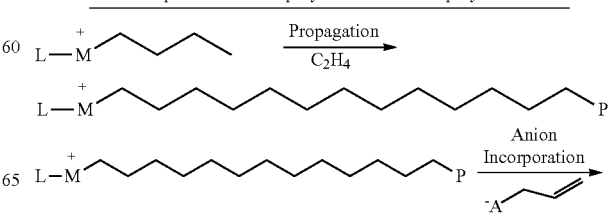

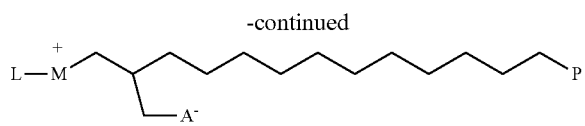

In Scheme 1, "A" is the anion of the co-catalyst, "P" is the polymer chain, "M" is the metal center of a catalyst, and "L" is a ligand of the catalyst. The depiction of Scheme 1 illustrates the means by which the anion of the co-catalyst in inserted or covalently incorporated into the polymer chain of the polyolefin. The vinyl terminated alkene of the anion of the co-catalyst functions as an olefin and is polymerized into the polymer chain. Scheme 1 is an illustration and not intending to be limiting. For example, Scheme 1 depicts a catalyst that is a metal-ligand catalyst (L-M). However, any catalyst that is activated by an activator or co-catalyst may be appropriate in the process of this disclosure.

The term "activator" refers to a compound that chemically reacts with a procatalyst in a manner that converts the procatalyst to a catalytically active catalyst. As used herein, the terms "co-catalyst" and "activator" are interchangeable terms. The term "procatalyst" refers to a compound that has catalytic activity when combined with an activator.

As previously mentioned, the residual activator anion in the produced polymer will lower the electrical resistance of the polymer, thereby increasing electrical loss, and decreasing the insulation ability of the produced polymer. Without intent to be bound by theory, it is believed that since the anion is incorporated into the polymer chain, the migration or diffusion of the anion of the co-catalysts is decreased throughout the composition of the polyolefin. Thus, the polyolefin produced from the process that includes incorporating the anion of the co-catalyst into the polymer chain of polyolefin has electrical properties that are better than expected, such as a lower dissipation factor than when compared to a comparative polymer produced under similar conditions except the co-catalyst was not incorporated into the polymer chain of the comparative polymer.

In embodiments, the polymer process includes polymerizing one or more (C2-C12)α-olefin monomers in the presence of at least one catalyst and at least one co-catalyst to produce a polyolefin. Then, the anion of the co-catalyst is inserted into a polymer chain of the polyolefin.

The co-catalyst comprises a cation and an anion. The anion has a structure according to formula (I):

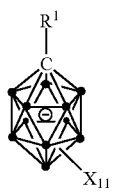

(I)

In formula (I), $R^1$ is an unsaturated $(C_2-C_{20})$hydrocarbyl having a vinyl terminated alkene and X is a halogen atom. In some embodiments, each X is chlorine. In other embodiments, each X is bromine.

A person of ordinary skill in the art would recognize that the structures of formulas (I) and (Ia) are carborane anions. When each X is chlorine, the structure of formula (I) has an empirical formula of $^-B_{11}CR^1Cl_{11}$, in which B are boron atoms, C is a carbon atom, Cl are chlorine atoms, and $R^1$ is previously defined. Each boron atom is indicated in formula (I) by a rounded ball. Each chlorine atom of formula (I) is bonded to the boron atom.

In one or more embodiments, the polyolefin has a dissipation factor less than that of a corresponding polyolefin composition produced under identical polymeric conditions except the molar amount of the anion of formula (I) is replaced by an identical molar amount of a comparative anion having the formula (Ia):

(Ia)

The phrase "under identical polymeric conditions" means that the polymerization process occurs under the same conditions in the same type of reactor. The "same type of reactor" does not limit the polymerization process to be performed in the reactor that produced the polyolefin of this disclosure, and does not limit the polymerization process to the same location. For example, if the polyolefin produced by the co-catalyst having an anion of formula (I) was polymerized in a batch reactor, the corresponding polyolefin composition produced by the co-catalyst having the anion of formula (Ia) is also polymerized in a batch reactor. Furthermore, "same conditions" means that each reactor is charged with identical molar amounts of: the catalyst, co-catalysts, co-monomer (if a comonomer is present), hydrogen (if hydrogen is present), and ethylene pressure (if ethylene is present); and is charged with the same volumetric amount of solvent; and that each reactor is heated to the same temperature at the same rate of temperature increase.

In some embodiments, the polymerization process includes polymerizing one or more $(C_2-C_{12})$α-olefin monomers in the presence of at least one catalyst and at least one co-catalyst to produce a polyolefin. The anion of the co-catalyst is inserted into a polymer chain of the polyolefin. The polyolefin comprises less than 1 mole percent of the anion of the co-catalyst. The structure of formula (Ia) is also a carborane and has the empirical formula $^-B_{11}CCl_{11}H$. Each atom is defined in formula (I), except H is a hydrogen atom bonded to the carbon atom.

In some embodiments, the co-catalyst comprises a cation and an anion, the anion according to formula (II):

$$^-BR^2R^3R^4R^5 \qquad (II)$$

In formula (II), $R^2$, $R^3$, $R^4$ and $R^5$ are independently chosen from $(C_1-C_{40})$hydrocarbyl. Each $(C_1-C_{40})$hydrocarbyl is substituted with at least one halogen, and at least one $(C_1-C_{40})$hydrocarbyl is substituted with a vinyl terminated alkene.

In embodiments of this disclosure, the anion of the co-catalyst has one vinyl terminated alkene. In one or more embodiments, the vinyl terminated alkene has a structure according to formula (III):

(III)

In formula (III), n is an integer from 1 to 10. In some embodiments, n is 1, 2, or 3.

In various embodiments, the vinyl terminated alkene has a structure according to formula (IV):

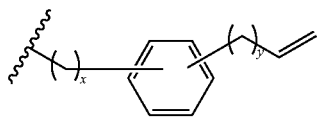
(IV)

In formula (V), subscript y is an integer from 1 to 10, and subscript x is 0, 1, 2, and 3. As shown in formula (IV), the two substituents, the groups associated with subscript x and subscript y, may be ortho, meta or para to each other.

In one or more embodiments, the vinyl terminated alkene according to formula (IV) has a structure according to formula (V):

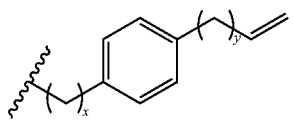
(V)

In formula (V), subscript x and subscript y are as defined in formula (IV). In formula (V), the two substituents, the groups associated with subscript x and subscript y, are para to one another.

In one or more embodiments, the polyolefin comprises greater than 0 mole percent (mol %) and less than 1 mol % of the anion of the co-catalyst based on the molar composition of the polyolefin. In some embodiments, the polyolefin comprises greater than 0 mol % and less than 0.5 mol % of the anion of the co-catalyst. In further embodiments, the polyolefin comprises greater than 0 and less than 0.1 mol % of the anion of the co-catalyst. In various embodiments, the polyolefin comprises greater than 0 mol % and less than 0.01 mol % of the anion of the co-catalyst based on the molar composition of the polyolefin.

In one or more embodiments, the co-catalyst includes the anion according to formula (I) and the cation having a formal charge of positive one (+1). In some embodiments of the co-catalyst, the cation is chosen from a protonated tri[$(C_1-C_{40})$hydrocarbyl] ammonium cation. In some embodiments, the cation is a protonated trialkylammonium cation, containing one or two $(C_{14}-C_{20})$alkyl groups on the ammonium cation. In one or more embodiments, the cation is $^+N(H)R^N_3$, where each $R^N$ is chosen from $(C_1-C_{20})$alkyl or $(C_6-C_{20})$aryl. In one or more embodiments, the cation is $^+N(H)R^N_3$, where at least two $R^N$ are chosen from $(C_{10}-C_{20})$ alkyl. In one or more embodiments, the cation is $^+N(H)R^N_3$, wherein $R^N$ is $(C_{16}-C_{18})$alkyl. In one or more embodiments, the cation is $^+N(CH_3)HR^N_2$, wherein $R^N$ is $(C_{16}-C_{18})$alkyl. In some embodiments, the cation is chosen from methyldi(octadecyl)ammonium cation, methyl(octadecyl)(hexadecyl)ammonium cation, methyldi(hexadecyl)ammonium cation, or methyldi(tetradecyl)ammonium cation. The methyldi(octadecyl)ammonium cation, methyl(octadecyl)(hexadecyl) ammonium cation, methyldi(hexadecyl)ammonium cation, or methyldi(tetradecyl)ammonium cation are collectively referred to herein as armeenium cations. Ionic compounds having armeenium cations are easily formed by protonating (with anhydrous HCl in ether, for example) methyldi(octadecyl)amine, methyl(octadecyl)(hexadecyl)amine, methyldi(hexadecyl)amine, or methyldi(tetradecyl)amine which are available from Akzo-Nobel under the Armeen™ trade names, for example Armeen™ M2HT. In other embodiments, the cation is triphenylmethyl carbocation ($^+C(C_6H_5)_3$), also referred to as trityl. In one or more embodiments, the cation is a tris-substituted-triphenylmethyl carbocation, such as $^+C(C_6H_4R^C)_3$, wherein each $R^C$ is independently chosen from $(C_1-C_{30})$alkyl. In other embodiments, the cation is chosen from anilinium, ferrocenium, or aluminoceniums. Anilinium cations are protonated nitrogen cations, such as $[HN(R^S)(R^N)_2]^+$, where $R^N$ is $(C_1-C_{20})$alkyl or H and $R^S$ is chosen from $(C_6-C_{20})$aryl, and each alkyl or aryl may be further substituted with —$OR^C$, for example $C_6H_5NMe_2H^+$. Aluminoceniums are aluminum cations, such as $R^S_2Al(THF)_2^+$, where $R^S$ is chosen from $(C_1-C_{30})$alkyl.

In illustrative embodiments, the catalyst systems may include one or more co-catalysts comprising an anion and a countercation, in which the anion is according to formula (I). The countercation, which is complexed with the anion of formula (I), is included in the illustrative embodiments. The illustrative embodiments of the anion of formula (I) include the following structures:

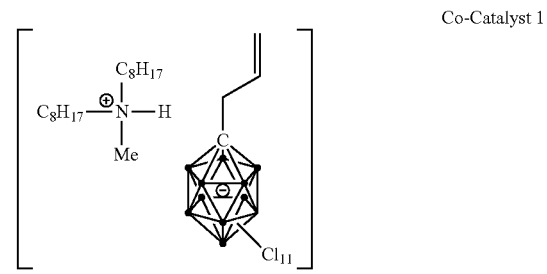
Co-Catalyst 1

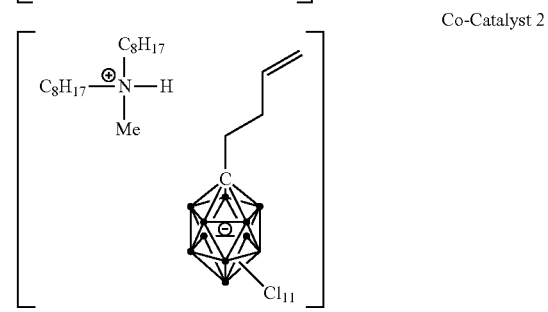
Co-Catalyst 2

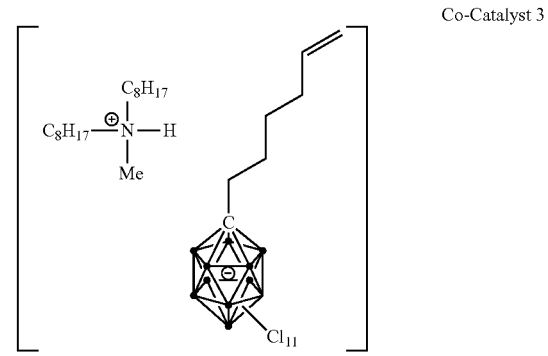
Co-Catalyst 3

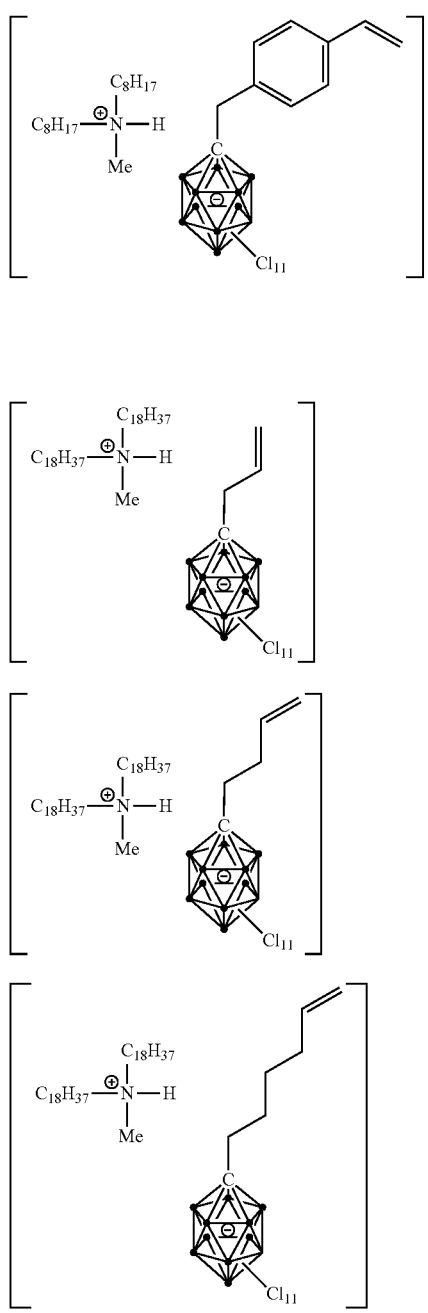

Co-Catalyst 4

Co-Catalyst 5

Co-Catalyst 6

Co-Catalyst 7

Polymeric Electrical Properties

Insulating mediums should be as efficient as possible. Electrical loss lowers the efficiency of a medium to insulate in the presence of an electric field. The resistance should be as high as possible for both alternating current (AC) and direct current (DC) systems, because the resistance is inversely related to the power or electric loss.

In a DC system (e.g., a photovoltaic encapsulant), energy loss manifests as the leakage of current from the encapsulated device to the external environment. This current (I) is directly related to the voltage (V) and inversely related to the resistance of the insulating medium (R) via the equation $I=V \times R^{-1}$. Therefore, the higher the resistance, the lower the current and the current leakage.

In an AC system (e.g., cable insulation) loss manifests as the absorption of energy by the medium in the presence of an electrical field. Measured in power (P), this loss is determined by the equation $P=V^2 \times \omega \times C \times \varepsilon' \times \tan \delta$ where $\omega$ is the angular frequency, $\varepsilon'$ is the relative permittivity, C is the capacitance, and $\tan \delta$ is the dissipation factor, $\tan \delta = (C \times R \times \omega)^{-1}$, resulting in the equation $P=V^2 \times \varepsilon' \times R^{-1}$. Since the resistance is inversely related to the power loss, the higher the resistance, the lower the power loss.

One physical effect that lowers the resistance of a medium is the diffusion of ions due to an electric field. In a system in which ionic diffusion dominates the electrical response, the resistance is related to the diffusing ions via the equation $R \propto 6 \times \pi \times \varepsilon' \times \varepsilon_0 \times \eta \times r \times C^{-1} \times q^{-2} \times N^{-1}$ where $\varepsilon_0$ is the permittivity of vacuum ($8.854 \times 10^{-12}$ F·m$^{-1}$), $\eta$ is the dynamic viscosity of the medium, r is the hydrodynamic radius of the ion, q is the charge of the ion, and N is the concentration of the ion. Since increased resistance decreases energy loss and a decrease in ion concentration increases resistance, a reduction in the concentration of ions diffusing through the medium decreases energy loss.

In addition to size and charge, the interaction of the ion with the surrounding medium and its dissociation energy with available counterions will affect its ability to diffuse through a given medium. Since not all ions diffuse equally, the ability of the ions in the activator to diffuse is an important characteristic. Without intending to be bound by theory, it is believed that when the anion of the co-catalyst of this disclosure of formula (I) and the countercation has a decreased diffusion, the resulting polymer of the co-catalyst of this disclosure has a decreased in energy loss, which provides good electrical properties.

In one or more embodiments, the polyolefin, produced by any process of this disclosure, has a dissipation factor of less than 0.10 at a frequency of 100 Hz and a temperature of 130° C. In various embodiments, the polyolefin has a dissipation factor of less than 1.00 at a frequency of 10 Hz and a temperature of 130° C. In other embodiments, the polyolefin has a dissipation factor of less than 10 at a frequency of 1.0 Hz and a temperature of 130° C. In some embodiments, the polyolefin has a dissipation factor of less than 100 at a frequency of 0.10 Hz and a temperature of 130° C.

Dissipation factor is related to the electrical properties of a resin. A reduction in the dissipation factor produces materials that may be used as dielectric media (e.g. cable insulation or electronic encapsulants). When the dissipation factor is predominantly caused by ions in the resin, removal or immobilization of these ions can reduce the dissipation factor and improve the electrical properties of the resin.

On a small scale, polymers produced with co-catalysts having an anion of formula (I) exhibit dissipation factors ten times less than our standard polymers produced with Comparative Co-Catalyst C1. Without being bound by theory, it is believed that the polyolefin produced by the co-catalysts having an anion of formula (I) will have a dissipation factor ten times less than Comparative Co-Catalyst C1 when the polyolefin is produced on an industrial scale. The dissipation factor of a standard poly(ethylene-octene) copolymer is about 1.0. Therefore, we predict that polyolefin polymers produced with co-catalysts having an anion of formula (I) would exhibit dissipation factors of 0.1 or less at 60 Hertz (Hz).

Catalyst System Components

The catalyst system may include a procatalyst. The procatalyst may be rendered catalytically active by contacting the complex to, or combining the complex with, a cocatalyst of this disclosure having anion of formula (I) and a cation, an anion of formula (II) and a cation, or anions of both formulas (I) and (II) and cations. The procatalyst may be chosen from a Group IV metal-ligand complex (Group IVB according to CAS or Group 4 according to IUPAC naming conventions), such as a titanium (Ti) metal-ligand complex, a zirconium (Zr) metal-ligand complex, or a hafnium (Hf) metal-ligand complex. Not intending to be limiting, examples of the procatalyst may be found in the following references: U.S. Pat. No. 8,372,927; WO 2010022228; WO 2011102989; U.S. Pat. Nos. 6,953,764; 6,900,321; WO 2017173080; U.S. Pat. Nos. 7,650,930; 6,777,509 WO 99/41294; U.S. Pat. No. 6,869,904; WO 2007136496. Theses references are herein incorporated by reference in their entirety.

In one or more embodiments, the Group IV metal-ligand complex includes a bis(phenylphenoxy) Group IV metal-ligand complex or a constrained geometry Group IV metal-ligand complex.

According to some embodiments, the bis(phenylphenoxy) metal-ligand complex has a structure according to formula (X):

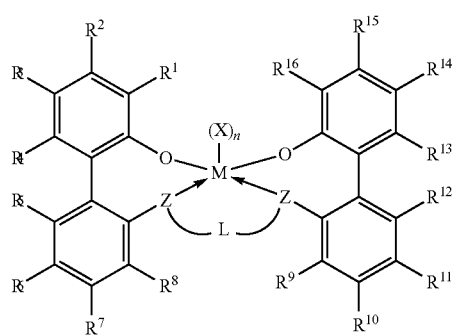

(X)

In formula (I), M is a metal chosen from titanium, zirconium, or hafnium, the metal being in a formal oxidation state of +2, +3, or +4. Subscript n of $(X)_n$ is 0, 1, or 2. When subscript n is 1, X is a monodentate ligand or a bidentate ligand, and when subscript n is 2, each X is chose from a monodentate ligand. L is a diradical selected from the group consisting of $(C_1-C_{40})$hydrocarbylene, $(C_1-C_{40})$heterohydrocarbylene, —Si($R^C)_2$—, —Si($R^C)_2$OSi($R^C)_2$—, —Si($R^C)_2$C($R^C)_2$—, —Si($R^C)_2$Si($R^C)_2$—, —Si($R^C)_2$C($R^C)_2$Si($R^C)_2$—, —C($R^C)_2$Si($R^C)_2$C($R^C)_2$—, —N($R^N$)C($R^C)_2$—, —N($R^N$)N($R^N$)—, —C($R^C)_2$N($R^N$)C($R^C)_2$—, —Ge($R^C)_2$—, —P($R^P$)—, —N($R^N$)—, —S—, —S(O)—, —S(O)_2—, N=C($R^C$)—, —C(O)O—, —OC(O)—, —C(O)N(R)—, and —N($R^C$)C(O)—. Each Z is independently chosen from —O—, —S—, —N($R^N$)—, or —P($R^P$)—; $R^1$ through $R^{16}$ are independently selected from the group consisting of —H, $(C_1-C_{40})$hydrocarbyl, $(C_1-C_{40})$heterohydrocarbyl, —Si($R^C)_3$, —Ge($R^C)_3$, —P($R^P)_2$, —N($R^N)_2$, —OR$^C$, —SR$^C$, —NO_2, —CN, —CF_3, $R^C$S(O)—, $R^C$S(O)_2—, —N=C($R^C)_2$, $R^C$C(O)O—, $R^C$OC(O)—, $R^C$C(O)N(R)—, $(R^C)_2$NC(O)—, halogen, radicals having formula (XI), radicals having formula (XII), and radicals having formula (XIII):

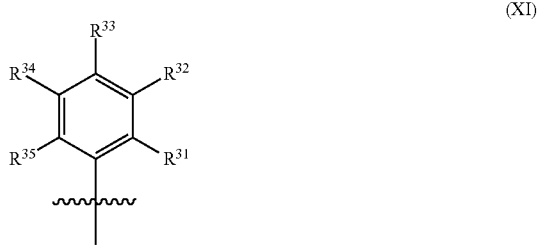

(XI)

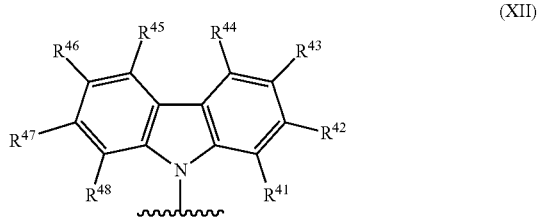

(XII)

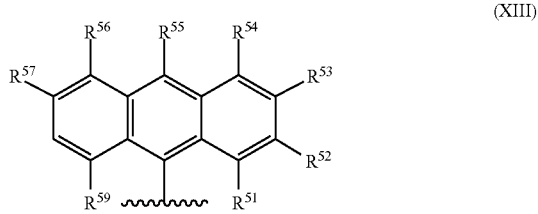

(XIII)

In formulas (XI), (XII), and (XIII), each of $R^{31}$-$R^{35}$, $R^{41}$-$R^{48}$, and $R^{51}$-$R^{59}$ is independently chosen from —H, $(C_1-C_{40})$hydrocarbyl, $(C_1-C_{40})$heterohydrocarbyl, —Si($R^C)_3$, —Ge($R^C)_3$, —P($R^P)_2$, —N($R^N)_2$, —OR$^C$, —SR$^C$, —NO_2, —CN, —CF_3, $R^C$S(O)—, $R^C$S(O)_2—, $(R^C)_2$C=N—, $R^C$C(O)O—, $R^C$OC(O)—, $R^C$C(O)N($R^N$)—, $(R^C)_2$NC(O)—, or halogen, provided at least one of $R^1$ or $R^{16}$ is a radical having formula (XI), a radical having formula (XII), or a radical having formula (XIII).

In one or more embodiments, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^KR^LN$—, wherein each of $R^K$ and $R^L$ independently is an unsubstituted $(C_1-C_{20})$hydrocarbyl.

Illustrative bis(phenylphenoxy) metal-ligand complexes that may be employed in the practice of the present invention include:

(2',2"-(propane-1,3-diylbis(oxy))bis(5'-chloro-3-(3,6-di-tert-octyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-chloro-5-(2,4,4-trimethylpentan-2-yl)biphenyl-2-ol)dimethyl-hafnium;

(2',2"-(propane-1,3-diylbis(oxy))bis(3'-chloro-3-(3,6-di-tert-butyl-9H-carbazol-9-yl)-5'-fluoro-5-(2,4,4-trimethylpentan-2-yl)biphenyl-2-ol)dimethyl-hafnium;

(2',2"-(propane-1,3-diylbis(oxy))bis(3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-cyano-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(5'-dimethylamino-3-(3,6-di-tert-butyl-9H-carbazol-9-yl)-3'-methyl-5-(2,4,4-trimethylpentan-2-yl)biphenyl-2-ol)dimethyl-hafnium;

(2',2"-(propane-1,3-diylbis(oxy))bis(3',5'-dimethyl-3-(3,6-di-tert-butyl-9H-carbazol-9-yl)-5-(2,4,4-trimethylpentan-2-yl)biphenyl-2-ol)dimethyl-hafnium;

(2',2''-(propane-1,3-diylbis(oxy))bis(5'-chloro-3-(3,6-di-tert-butyl-9H-carbazol-9-yl)-3'-ethyl-5-(2,4,4-trimethylpentan-2-yl)biphenyl-2-ol)dimethyl-hafnium;

(2',2''-(propane-1,3-diylbis(oxy))bis(3-(3,6-di-tert-butyl-9H-carbazol-9-yl)-3'-methyl-5'-tert-butyl-5-(2,4,4-trimethylpentan-2-yl)biphenyl-2-ol)dimethyl-hafnium;

(2',2''-(propane-1,3-diylbis(oxy))bis(3-(3,6-di-tert-butyl-9H-carbazol-9-yl)-5'-fluoro-3'-methyl-5-(2,4,4-trimethylpentan-2-yl)biphenyl-2-ol)dimethyl-hafnium;

(2',2''-(propane-1,3-diylbis(oxy))bis(3-(9H-carbazol-9-yl)-5'-chloro-3'-methyl-5-(2,4,4-trimethylpentan-2-yl)biphenyl-2-ol)dimethyl-hafnium;

(2',2''-(propane-1,3-diylbis(oxy))bis(3-(3,6-di-tert-butyl-9H-carbazol-9-yl)-3'-methyl-5'-trifluoromethyl-5-(2,4,4-trimethylpentan-2-yl)biphenyl-2-ol)dimethyl-hafnium;

(2',2''-(2,2-dimethyl-2-silapropane-1,3-diylbis(oxy))bis(3',5'-dichloro-3-(3,6-di-tert-butyl-9H-carbazol-9-yl)-5-(2,4,4-trimethylpentan-2-yl)biphenyl-2-ol)dimethyl-hafnium;

(2'2''-(2,2-dimethyl-2-silapropane-1-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2''-(propane-1,3-diylbis(oxy))bis(3'-bromo-5'-chloro-3-(3,6-di-tert-butyl-9H-carbazol-9-yl)-5-(2,4,4-trimethylpentan-2-yl)biphenyl-2-ol)dimethyl-hafnium;

(2',2''-(propane-1,3-diylbis(oxy))-(5'-chloro-3-(3,6-di-tert-butyl-9H-carbazol-9-yl)-3'-fluoro-5-(2,4,4-trimethylpentan-2-yl)biphenyl-2-01)-(3'',5''-dichloro-3-(3,6-di-tert-butyl-9H-carbazol-9-yl)-5-(2,4,4-trimethylpentan-2-yl)biphenyl-2-ol)dimethyl-hafnium;

(2',2''-(propane-1,3-diylbis(oxy))bis(3-(3,6-di-tert-butyl-9H-carbazol-9-yl)-5'-fluoro-3'-trifluoromethyl-5-(2,4,4-trimethylpentan-2-yl)biphenyl-2-ol)dimethyl-hafnium;

(2',2''-(butane-1,4-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2''-(ethane-1,2-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-hafnium;

(2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-zirconium;

(2',2''-(propane-1,3-diylbis(oxy))bis(3-(3,6-di-tert-butyl-9H-carbazol-9-yl)-3',5'-dichloro-5-(2,4,4-trimethylpentan-2-yl)biphenyl-2-ol)dimethyl-titanium; and (2',2''-(propane-1,3-diylbis(oxy))bis(5'-chloro-3-(3,6-di-tert-butyl-9H-carbazol-9-yl)-3'-methyl-5-(2,4,4-trimethylpentan-2-yl)biphenyl-2-ol)dimethyl-titanium.

According to some embodiments, the Group IV metal-ligand complex may include a cyclopentadienyl procatalyst according to formula (XIV):

$Lp_iMX_mX'_nX''_p$, or a dimer thereof (XIV).

In formula (XIV), Lp is an anionic, delocalized, π-bonded group that is bound to M, containing up to 50 non-hydrogen atoms. In some embodiments of formula (XIV), two Lp groups may be joined together forming a bridged structure, and further optionally one Lp may be bound to X.

In formula (XIV), M is a metal of Group 4 of the Periodic Table of the Elements in the +2, +3, or +4 formal oxidation state. X is an optional, divalent substituent of up to 50 non-hydrogen atoms that together with Lp forms a metallocycle with M. X' is an optional neutral ligand having up to 20 non hydrogen atoms; each X'' is independently a monovalent, anionic moiety having up to 40 non-hydrogen atoms. Optionally, two X'' groups may be covalently bound together forming a divalent dianionic moiety having both valences bound to M, or, optionally two X'' groups may be covalently bound together to form a neutral, conjugated or nonconjugated diene that is π-bonded to M, in which M is in the +2 oxidation state. In other embodiments, one or more X'' and one or more X' groups may be bonded together thereby forming a moiety that is both covalently bound to M and coordinated thereto by means of Lewis base functionality. Subscript i of $Lp_i$ is 0, 1, or 2; subscript n of $X'_n$ is 0, 1, 2, or 3; subscript m of $X_m$ is 0 or 1; and subscript p of $X''_p$ is 0, 1, 2, or 3. The sum of i+m+p is equal to the formula oxidation state of M.

Illustrative Group IV metal-ligand complexes may include cyclopentadienyl procatalysts that may be employed in the practice of the present invention include:

cyclopentadienyltitaniumtrimethyl;
cyclopentadienyltitaniumtriethyl;
cyclopentadienyltitaniumtriisopropyl;
cyclopentadienyltitaniumtriphenyl;
cyclopentadienyltitaniumtribenzyl;
cyclopentadienyltitanium-2,4-dimethylpentadienyl;
cyclopentadienyltitanium-2,4-dimethylpentadienyl•triethylphosphine;
cyclopentadienyltitanium-2,4-dimethylpentadienyl•trimethylphosphine;
cyclopentadienyltitaniumdimethylmethoxide;
cyclopentadienyltitaniumdimethylchloride;
pentamethylcyclopentadienyltitaniumtrimethyl;
indenyltitaniumtrimethyl;
indenyltitaniumtriethyl;
indenyltitaniumtripropyl;
indenyltitaniumtriphenyl;
tetrahydroindenyltitaniumtribenzyl;
pentamethylcyclopentadienyltitaniumtriisopropyl;
pentamethylcyclopentadienyltitaniumtribenzyl;
pentamethylcyclopentadienyltitaniumdimethylmethoxide;
pentamethylcyclopentadienyltitaniumdimethylchloride;
bis($\eta^5$-2,4-dimethylpentadienyetitanium;
bis($\eta^5$-2,4-dimethylpentadienyetitaniumtrimethylphosphine;
bis($\eta^5$-2,4-dimethylpentadienyetitaniumtriethylphosphine;
octahydrofluorenyltitaniumtrimethyl;
tetrahydroindenyltitaniumtrimethyl;
tetrahydrofluorenyltitaniumtrimethyl;
(tert-butylamido)(1,1-dimethyl-2,3,4,9,10-η-1,4,5,6,7,8-hexahydronaphthalenyl)dimethylsilanetitaniumdimethyl;
(tert-butylamido)(1,1,2,3-tetramethyl-2,3,4,9,10-η-1,4,5,6,7,8-hexahydronaphthalenyl)dimethylsilanetitaniumdimethyl;
(tert-butylamido)(tetramethyl-$\eta^5$-cyclopentadienyl) dimethylsilanetitanium dibenzyl;
(tert-butylamido)(tetramethyl-$\eta^5$-cyclopentadienyedimethylsilanetitanium dimethyl;
(tert-butylamido)(tetramethyl-$\eta^5$-cyclopentadienyl)-1,2-ethanediyltitanium dimethyl;
(tert-butylamido)(tetramethyl-$\eta^5$-indenyedimethylsilanetitanium dimethyl;
(tert-butylamido)(tetramethyl-$\eta^5$-cyclopentadienyedimethylsilanetitanium (III) 2-(dimethylamino)benzyl;
(tert-butylamido)(tetramethyl-$\eta^5$-cyclopentadienyedimethylsilanetitanium (III) allyl;
(tert-butylamido)(tetramethyl-$\eta^5$-cyclopentadienyedimethylsilanetitanium (III) 2,4-dimethylpentadienyl;
(tert-butylamido)(tetramethyl-$\eta^5$-cyclopentadienyedimethylsilanetitanium (II) 1,4-diphenyl-1,3-butadiene;
(tert-butylamido)(tetramethyl-$\eta^5$-cyclopentadienyedimethylsilanetitanium (II) 1,3-pentadiene;
(tert-butylamido)(2-methylindenyl)dimethylsilanetitanium (II) 1,4-diphenyl-1,3-butadiene;

(tert-butylamido)(2-methylindenyl)dimethylsilanetitanium (II) 2,4-hexadiene;
(tert-butylamido)(2-methylindenyl)dimethylsilanetitanium (IV) 2,3-dimethyl-1,3-butadiene;
(tert-butylamido)(2-methylindenyl)dimethylsilanetitanium (IV) isoprene;
(tert-butylamido)(2-methylindenyl)dimethylsilanetitanium (IV) 1,3-butadiene;
(tert-butylamido)(2,3-dimethylindenyl)dimethylsilanetitanium (IV) 2,3-dimethyl-1,3-butadiene;
(tert-butylamido)(2,3-dimethylindenyl)dimethylsilanetitanium (IV) isoprene;
(tert-butylamido)(2,3-dimethylindenyl)dimethylsilanetitanium (IV) dimethyl;
(tert-butylamido)(2,3-dimethylindenyl)dimethylsilanetitanium (IV) dibenzyl;
(tert-butylamido)(2,3-dimethylindenyl)dimethylsilanetitanium (IV) 1,3-butadiene;
(tert-butylamido)(2,3-dimethylindenyl)dimethylsilanetitanium (II) 1,3-pentadiene;
(tert-butylamido)(2,3-dimethylindenyl)dimethylsilanetitanium (II) 1,4-diphenyl-1,3-butadiene;
(tert-butylamido)(2-methylindenyl)dimethylsilanetitanium (II) 1,3-pentadiene;
(tert-butylamido)(2-methylindenyl)dimethylsilanetitanium (IV) dimethyl;
(tert-butylamido)(2-methylindenyl)dimethylsilanetitanium (IV) dibenzyl;
(tert-butylamido)(2-methyl-4-phenylindenyl)dimethylsilanetitanium (II) 1,4-diphenyl-1,3-butadiene;
(tert-butylamido)(2-methyl-4-phenylindenyl)dimethylsilanetitanium (II) 1,3-pentadiene;
(tert-butylamido)(2-methyl-4-phenylindenyl)dimethylsilanetitanium (II) 2,4-hexadiene;
(tert-butylamido)(tetramethyl-$\eta^5$-cyclopentadienyl)dimethyl-silanetitanium (IV) 1,3-butadiene;
(tert-butylamido)(tetramethyl-$\eta^5$-cyclopentadienyl)dimethylsilanetitanium (IV) 2,3-dimethyl-1,3-butadiene;
(tert-butylamido)(tetramethyl-$\eta^5$-cyclopentadienyl)dimethylsilanetitanium (IV) isoprene;
(tert-butylamido)(tetramethyl-$\eta^5$-cyclopentadienyl)dimethyl-silanetitanium (II) 1,4-dibenzyl-1,3-butadiene;
(tert-butylamido)(tetramethyl-$\eta^5$-cyclopentadienyl)dimethylsilanetitanium (II) 2,4-hexadiene;
(tert-butylamido)(tetramethyl-$\eta^5$-cyclopentadienyl)dimethyl-silanetitanium (II) 3-methyl-1,3-pentadiene;
(tert-butylamido)(2,4-dimethylpentadien-3-yl)dimethylsilanetitaniumdimethyl;
(tert-butylamido)(6,6-dimethyleyelohexadienyl)dimethylsilanetitaniumdimethyl;
(tert-butylamido)(1,1-dimethyl-2,3,4,9,10-$\eta$-1,4,5,6,7,8-hexahydronaphthalen-4-yl)dimethylsilanetitaniumdimethyl;
(tert-butylamido)(1,1,2,3-tetramethyl-2,3,4,9,10-$\eta$-1,4,5,6,7,8-hexahydronaphthalen-4-yl)dimethylsilanetitaniumdimethyl;
(tert-butylamido)(tetramethyl-$\eta^5$-cyclopentadienyl methylphenylsilanetitanium (IV) dimethyl;
(tert-butylamido)(tetramethyl-$\eta^5$-cyclopentadienyl methylphenylsilanetitanium (II) 1,4-diphenyl-1,3-butadiene;
1-(tert-butylamido)-2-(tetramethyl-$\eta^5$-cyclopentadienyl) ethanediyltitanium (IV) dimethyl;
1-(tert-butylamido)-2-(tetramethyl-$\eta^5$-cyclopentadienyl) ethanediyl-titanium (II) 1,4-diphenyl-1,3-butadiene;

Each of the illustrative cyclopentadienyl procatalyst may include zirconium or hafnium in place of the titanium metal centers of the cyclopentadienyl procatalyst.

Other catalysts, especially catalysts containing other Group IV metal-ligand complexes, will be apparent to those skilled in the art.

The catalyst systems of this disclosure may include co-catalysts or activators in addition to the co-catalyst of this disclosure having the anion of formula (I) and a countercation. Such additional co-catalysts may include, for example, tri(hydrocarbyl)aluminum compounds having from 1 to 10 carbons in each hydrocarbyl group, an oligomeric or polymeric alumoxane compound, di(hydrocarbyl)(hydrocarbyloxy)aluminums compound having from 1 to 20 carbons in each hydrocarbyl or hydrocarbyloxy group, or mixtures of the foregoing compounds. These aluminum compounds are usefully employed for their beneficial ability to scavenge impurities such as oxygen, water, and aldehydes from the polymerization mixture.

The di(hydrocarbyl)(hydrocarbyloxy)aluminum compounds that may be used in conjunction with the activators described in this disclosure correspond to the formula $T^1_2AlOT^2$ or $T^1_1Al(OT^2)_2$ wherein $T^1$ is a secondary or tertiary ($C_3$-$C_6$)alkyl, such as isopropyl, isobutyl or tert-butyl; and $T^2$ is a alkyl substituted ($C_6$-$C_{30}$)aryl radical or aryl substituted ($C_1$-$C_{30}$)alkyl radical, such as 2,6-di(tert-butyl)-4-methylphenyl, 2,6-di(tert-butyl)-4-methylphenyl, 2,6-di(tert-butyl)-4-methyltolyl, or 4-(3',5'-di-tert-butyl-tolyl)-2,6-di-tert-butylphenyl.

Additional examples of aluminum compounds include [$C_6$]trialkyl aluminum compounds, especially those wherein the alkyl groups are ethyl, propyl, isopropyl, n-butyl, isobutyl, pentyl, neopentyl, or isopentyl, dialkyl(aryloxy) aluminum compounds containing from 1-6 carbons in the alkyl group and from 6 to 18 carbons in the aryl group (especially (3,5-di(t-butyl)-4-methylphenoxy)diisobutylaluminum), methylalumoxane, modified methylalumoxane and diisobutylalumoxane.

In the catalyst systems according to embodiments of this disclosure, the molar ratio of the co-catalyst of this disclosure to Group IV metal-ligand complex may be from 1:10,000 to 1000:1, such as, for example, from 1:5000 to 100:1, from 1:100 to 100:1 from 1:10 to 10:1, from 1:5 to 1:1, or from 1.25:1 to 1:1. The catalyst systems may include combinations of one or more co-catalyst of this disclosure complex described in this disclosure.

Polyolefins

The catalytic systems described in the preceding paragraphs are utilized in the polymerization of olefins, primarily ethylene and 1-octene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, 4-methyl-1-pentene, 5-ethylidene-2-norbornene, and 5-vinyl-2-norbornene. For example, the one or more α-olefin co-monomers may be selected from the group consisting of propylene, 1-butene, 1-hexene, and 1-octene; or in the alternative, from the group consisting of 1-hexene and 1-octene.

The polyolefins, for example homopolymers and/or interpolymers (including copolymers) of ethylene and optionally one or more co-monomers such as α-olefins, may comprise from at least 50 mole percent (mol %) monomer units derived from ethylene. All individual values and subranges encompassed by "from at least 50 mol %" are disclosed herein as separate embodiments; for example, the ethylene-based polymers, homopolymers and/or interpolymers (including copolymers) of ethylene and optionally one or more co-monomers such as α-olefins may comprise at least 60 mol % monomer units derived from ethylene; at least 70 mol % monomer units derived from ethylene; at least 80 mol % monomer units derived from ethylene; or from 50 to 100 mol % monomer units derived from ethylene; or from 80 to 100 mol % units derived from ethylene.

In some embodiments, the polyolefin produced from the process of this disclosure may comprise at least 90 mole percent units derived from ethylene. All individual values and subranges from at least 90 mole percent are included herein and disclosed herein as separate embodiments. For example, the ethylene-based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene-based polymer, the amount of additional α-olefin is less than 50 mol %; other embodiments include at least 0.5 mol % to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene-based polymers. Such conventional polymerization processes include, but are not limited to, solution polymerization processes, gas-phase polymerization processes, slurry-phase polymerization processes, and combinations thereof using one or more conventional reactors such as loop reactors, isothermal reactors, fluidized-bed gas-phase reactors, stirred-tank reactors, batch reactors in parallel, series, or any combinations thereof, for example.

In one embodiment, the ethylene-based polymer may be produced via solution polymerization in a dual reactor system, for example a dual-loop reactor system, wherein ethylene and optionally one or more α-olefins are polymerized in the presence of the catalyst system, as described herein, and optionally one or more co-catalysts. In another embodiment, the ethylene-based polymer may be produced via solution polymerization in a dual reactor system, for example a dual-loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene-based polymer may be produced via solution polymerization in a dual reactor system, for example a dual-loop reactor system, wherein ethylene and optionally one or more α-olefins are polymerized in the presence of the catalyst system, as described herein, in both reactors.

In another embodiment, the ethylene-based polymer may be produced via solution polymerization in a single reactor system, for example a single-loop reactor system, in which ethylene and optionally one or more α-olefins are polymerized in the presence of the catalyst system, as described within this disclosure, and optionally one or more co-catalysts, as described in the preceding paragraphs.

The ethylene-based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene-based polymers may contain any amounts of additives. The ethylene-based polymers may comprise from about 0 to about 10 percent by weight of the total amount of such additives, based on the weight of the ethylene-based polymers and the one or more additives. The ethylene-based polymers may further comprise fillers, which may include, but are not limited to, organic or inorganic fillers. The ethylene-based polymers may contain from about 0 to about 20 weight percent fillers such as, for example, calcium carbonate, talc, or $Mg(OH)_2$, based on the combined weight of the ethylene-based polymers and all additives or fillers. The ethylene-based polymers may further be blended with one or more polymers to form a blend.

In some embodiments, a polymerization process for producing an polyolefin polymer may include polymerizing ethylene and at least one additional α-olefin in the presence of a catalyst system, wherein the catalyst system incorporates at least one metal-ligand complex and at least one co-catalyst of this disclosure and, optionally a scavenger. The polyolefin resulting from such a catalyst system that incorporates the metal-ligand complex and the co-catalyst may have a density according to ASTM D792 (incorporated herein by reference in its entirety) from 0.853 to 0.920 $g/cm^3$, from 0.870 $g/cm^3$ to 0.920 $g/cm^3$, from 0.870 $g/cm^3$ to 0.910 $g/cm^3$, or from 0.870 $g/cm^3$ to 0.900 $g/cm^3$, for example.

In another embodiment, the polymer resulting from the catalyst system that includes the metal-ligand complex and the co-catalyst of this disclosure having an anion of formula (I) has a melt flow ratio ($I_{10}/I_2$) from 1 to 25, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex has a molecular-weight distribution (MWD) from 1 to 25, where MWD is defined as $M_w/M_n$, with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

ADD experimental for dissipation factor

Batch Reactor Procedure

Batch reactor experiments were performed in a 1-gallon continuous stirred tank reactor. The reactor was loaded with Isopar-E hydrocarbon solvents, hydrogen, and the appropriate amount of octene comonomer before being heated to the specified temperature and pressurized with ethylene to 450 psi. When the reactor was at pressure the polymerization was initiated by adding an activated catalyst solution comprising the procatalyst, co-catalyst of this disclosure, solvent, and triethylaluminum scavenger. Polymerization was allowed to proceed for 10 minutes while maintaining reactor temperature and pressure. After the reaction was completed the polymer was collected and dried in a vacuum oven overnight before being analyzed.

General Procedure for 1-Octene Polymerization:

In a nitrogen-filled glovebox, neat 1-octene (11 mL) was added to a 40 mL vial equipped with a stir bar. The vial was placed in a polyurethane insulating block was placed on a magnetic stir plate. Solutions of procatalyst and activator (1.2-1.25 equiv. relative to procatalyst) in toluene were added sequentially. The vial was capped, and the reaction was stirred for the specified time (3 h for Procatalyst 2 and Procatalyst 3; 6 days for Procatalyst 3). All volatiles were removed under reduced pressure, yielding the polyoctene resin, which was then characterized by GPC and submitted for electrical testing.

General Procedure for Ethylene/1-Octene Copolymerization:

Ethylene/1-Octene screening is performed in a high throughput parallel polymerization reactor (PPR) system. The PPR system is comprised of an array of 48 single cell (6×8 matrix) reactors in an inert atmosphere glovebox. Each cell is equipped with a glass insert with an internal working liquid volume of approximately 5 mL. Each cell has independent controls for pressure and was continuously stirred at 800 rpm with PEEK stir paddles. Catalyst, ligand, and metal precursor solutions are prepared in toluene. All liquids (i.e. solvent, 1-octene, scavenger, activator, and procatalyst solutions) are added via robotic syringes. Gaseous reagents (i.e. ethylene) are added via a gas injection port. Prior to each run, the reactors are heated to 80° C., purged with ethylene, and vented.

In order to produce sufficient quantities of polymer for electrical testing, 24 replicates (half of the 48 reactors) are performed for each procatalyst and activator combination. The resulting polymer from the 24 replicates was then combined.

The reactors were heated to 100° C., then pressured to 25.3 psig with ethylene, and a portion of Isopar-E was added. Toluene solutions of reagents were then added to each reactor in the following order: (1) 1-octene (1.10 mL for Procatalyst 3, 2.26 mL for Procatalyst 2); (2) Scavenger Triethylaluminum (TEA) (1 µmol); (3) Activator (Comparative Co-catalyst C1-C3 or Co-Catalysts 1-7 (i.e. alkenyl-substituted carborane) (the amounts add are in a 1.2 molar equiv. relative to procatalyst); (4) Procatalyst (20 nmol for Procatalyst 3, 80 nmol for Procatalyst 2).

Each liquid addition is chased with a small amount of Isopar-E so that after the final addition, a total reaction volume of 5 mL is reached. Upon addition of the catalyst, the PPR software began monitoring the pressure of each cell. The desired pressure (within approximately 2-6 psig) is maintained by the supplemental addition of ethylene gas by opening the valve at the set point minus 2 psi and closing it when the pressure reached 2 psi higher. All drops in pressure are cumulatively recorded as "Uptake" or "Conversion" of the ethylene for the duration of the run or until the uptake or conversion requested value is reached, whichever occurred first. Each reaction is then quenched by addition of 10% carbon monoxide in argon for 1 to 4 minutes at 40-50 psi higher than the reactor pressure. In order to prevent the formation of too much polymer in any given cell, the reaction was quenched upon reaching a predetermined uptake level (50 psig). After all the reactors were quenched they were allowed to cool to 70° C., when they were then vented and the glass tube inserts with sample were removed. The polymer containing solutions from the 24 reactors containing the same procatalyst and activator solution were combined and allowed to devolatilize in a fume hood for several days. The resulting resins were then dried in a vacuum oven at 80° C. for 3 hours and 140° C. for 4 hours in one consecutive cycle, weighed to determine polymer yield and submitted for GPC analysis.

EXAMPLES

Examples 1 to 3 are synthetic procedures for intermediates of co-catalysts and for co-catalysts themselves. Example 4 is the mass spectrometry results. Example 5 is the polymer results.

Reaction mixtures for the mass spectrometry results of Example 4 were prepared at 5 mg/mL in uninhibited tetrahydrofuran (THF). Each sample was subjected to negative ion mode flow injection mass spectrometry analysis on an Agilent 1290 Infinity II Ultrahigh Performance Liquid Chromatograph (UHPLC) and Agilent 6538 Ultra High Definition Accurate-Mass Quadrupole Time of Flight mass spectrometer (QTOF MS). 20 microliters of analyte solution were injected onto the UHPLC in flow injection mode, where the mobile phases were 66.7% of uninhibited THF and 33.3% of 1 g/L ammonium formate in methanol (flow rate of 0.3 mL/min). Effluent from the liquid chromatograph was introduced into the MS and ionized in the negative ion mode by electrospray ionization. A combination of MS and MS/MS data were collected. Mass spectra were subjected to an external calibration to generate accurate mass information within +/−10 mDa. Following the external calibration, accurate mass prediction software (Agilent Masshunter) was utilized to generate empirical formulae for MS and fragment ions. Utilizing both the predicted empirical formula and the dissociation behavior of each parent ion, proposed structures have been provided.

Unless specified otherwise, all manipulations were performed under an Ar atmosphere using standard Schlenk line of glovebox techniques. Toluene, pentane, $C_6D_6$ and THF were dried over $NaK/Ph_2CO$/18-crown-6, distilled or vacuum transferred and stored over molecular sieves in an Ar-filled glovebox. NMR spectra were recorded on a Varian Inova 500 spectrometer ($^1H$ NMR, 499.703 MHz, $^{13}C$ NMR 125.580 MHz), Varian Inova 400 ($^{11}B$ NMR, 128.191 MHz) spectrometer, Bruker 400 ($^{13}C$ 100, $^{11}B$ 102 MHz). Chemical shifts are reported in δ (ppm). For $^1H$ and $^{13}C$ NMR spectra, the residual solvent peak was used as an internal reference ($^1H$ NMR: δ 7.16 for $C_6D_6$, 1.94 for $CD_3CN$, 7.26 for $CDCl_3$; $^{13}C$ NMR: δ 77.16 for $CDCl_3$, 1.32 for $CD_3CN$). MALDI mass spectrometric analyses of the carborane anions were carried out by the Texas A&M University Laboratory for Biological Mass Spectrometry, and simulated MALDI(−) spectra were generated using a publicly available isotope distribution calculator and mass spectrometry plotter.[1] For $^{11}B$ NMR, spectra were referenced externally to δ=0 ppm by using $BF_3 \cdot Et_2O$. NaH was purchased from Sigma-Aldrich and washed with hexane before using; 6-bromo-1-hexene, 4-bromo-1-butene, allylbromide and 1-iododecane was purchased from Matrix Scientific and used without further purification. 4-vinylbenzylchloride was purchased from Sigma Aldrich. $[Me_3NH][CHB_{11}Cl_{11}]$,[2] $[^nOctyl_2MeNH]Cl$ and $[(^nC_{18}H_{37})_2MeNH]Cl$ were synthesized according to the published procedure.

One or more features of the present disclosure are illustrated in view of the examples as follows:

Example 1—General Procedure for the Synthesis of $Na[R'CB_{11}Cl_{11}]$

To a 50 mL Schlenk flask, 500 mg $[Me_3NH][CHB_{11}Cl_{11}]$ and 2.5 equiv NaH were loaded with 20 mL THF. The resulting suspension was stirred at room temperature for 2 h until it stopped bubbling. All volatiles were removed under vacuum, and then 20 mL THF was added with 1.1 equiv R'-Hal (allyl bromide, 4-bromo-1-butene, 6-bromo-1-hexene, 4-chloromethylstyrene, or decyl iodide). The suspension was further stirred at room temperature overnight. NaCl was removed by filtering the solution through a short pad of Celite. All volatiles were removed under reduced pressure. The residue was washed with cold pentane and further dried under vacuum to yield Na[R'CB$_{11}$Cl$_{11}$] as a white solid. Each of the following examples were characterized by proton nuclear magnetic resonance (H$^1$ NMR) and carbon nuclear magnetic resonance ($^{13}$C NMR), and boron nuclear magnetic resonance ($^{11}$B NMR).

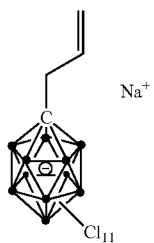

Na[Allyl-CB$_{11}$Cl$_{11}$]: 427 mg (85% yield). $^1$H NMR (500 MHz, CD$_3$CN): δ 6.10 (ddt, J=17.2, 9.9, 7.4 Hz, 1H), 5.13 (dq, J=16.7, 1.4 Hz, 1H), 5.08-5.01 (dq, J=16.7, 1.4 Hz, 1H), 3.01 (d, J=7.3 Hz, 3H). $^{11}$B{$^1$H} NMR (128 MHz, CD$_3$CN): δ −3.03, −10.10, −11.73. $^{13}$C{$^1$H} NMR (100 MHz, CD$_3$CN): δ 130.5 (s, CHCH$_2$), 120.4 (s, CHCH$_2$), 49.5 (brs, carborane-C), 35.6 (s, CH$_2$CHCH$_2$).

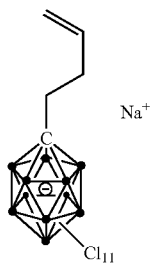

Na[Butenyl-CB$_{11}$Cl$_{11}$]: 427 mg Na[Butenyl-CB$_{11}$Cl$_{11}$] (85% yield)$^1$H NMR (500 MHz, CDCl$_3$): δ 5.72 (ddt, J=17.0, 10.3, 6.6 Hz, 1H), 5.08 (ddd, J=17.4, 3.1, 1.6 Hz, 1H), 5.03 (ddd, J=10.2, 3.1 Hz, 1.6 Hz, 1H), 2.69-2.61 (m, 2H), 2.37 (t, J=8.9 Hz, 2H). $^{11}$B{$^1$H} NMR (128 MHz, CDCl$_3$): δ −3.87, −10.52, −11.63. $^{13}$C{$^1$H} NMR (100 MHz, CD$_3$CN): δ 137.6 (s, CH$_2$CH$_2$CHCH$_2$), 116.6 (s, CHCH$_2$), 50.6 (brs, carborane-C), 31.4 (s, CH$_2$CH$_2$CHCH$_2$), 29.6 (s, CH$_2$CH$_2$CHCH$_2$).

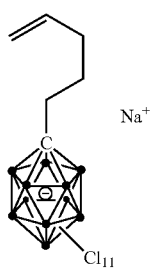

Na[hexenyl-CB$_{11}$Cl$_{11}$]: 300 mg Na[hexenyl-CB$_{11}$Cl$_{11}$] (87% yield)$^1$H NMR (400 MHz, CD$_3$CN): δ 5.77 (ddt, J=17.0, 10.2, 6.7 Hz, 1H), 4.99 (dq, J=17.2, 1.7 Hz, 1H), 4.93 (ddt, J=10.2, 2.3, 1.2 Hz, 1H). 2.30-2.20 (m, 2H), 2.07-1.97 (m, 2H), 1.90-1.75 (m, 2H) 1.32 (p, J=7.4 Hz, 2H). $^{11}$B{$^1$H} NMR (128 MHz, CD$_3$CN): δ −2.94, −9.96, −11.58. $^{13}$C{$^1$H} NMR (100 MHz, CD$_3$CN): δ 139.2 (s, CHCH$_2$), 115.3 (s, CHCH$_2$), 51.4 (brs, carborane-C), 33.6 (s, alpha-CH$_2$), 31.8 (s, CH$_2$), 29.9 (s, CH$_2$), 24.6 (s, CH$_2$).

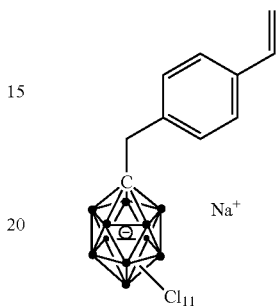

Na[vinylbenzylCB$_{11}$Cl$_{11}$]: 449 mg (89%). $^1$H NMR (500 MHz, CD$_2$C$_{12}$) δ 7.46 (d, J=8.2 Hz, 2H), 7.27 (d, J=8.2 Hz, 2H), 6.69 (dd, J=17.6, 10.9 Hz, 1H), 5.75 (d, J=17.6 Hz, 1H), 5.24 (d, J=11.2 Hz, 1H), 3.67 (s, 2H). $^{11}$B{$^1$H} NMR (128 MHz, CD$_2$C$_{12}$): δ −3.32, −10.18, −11.16. $^{13}$C{$^1$H} NMR (100 MHz, CD$_3$CN): δ 137.5 (s, CHCH$_2$), 137.0 (s, Ph) 134.8 (s, Ph), 131.0 (s, Ph), 125.4 (s, Ph), 114.6 (s, Ph), 49.5 (brs, carborane-C), 36.1 (s, PhCH$_2$).

Na[DecylCB$_{11}$Cl$_{11}$]: 1.46 g (95%). $^1$H NMR (500 MHz, CDCl$_3$) δ 2.27 (t, J=9.2 Hz, 2H), 2.10 (s, 4H), 1.41-1.07 (m, 12H), 0.87 (t, J=6.9 Hz, 3H). $^{11}$B{$^1$H} NMR (128 MHz, CDCl$_3$): δ −4.14, −10.59, −11.52. $^{13}$C{$^1$H} NMR (100 MHz, CD$_3$CN): δ 49.5 (brs, carborane-C), 32.4 (s, decylCH$_2$), 31.8 (s, decylCH$_2$), 30.5 (s, decylCH$_2$), 30.0 (s, decylCH$_2$), 29.9 (s, decylCH$_2$), 29.8 (s, decylCH$_2$), 29.4 (s, decylCH$_2$), 24.9 (s, decylCH$_2$), 23.2 (s, decylCH$_2$), 14.4 (s, decylCH$_3$).

Example 2—General Synthesis of [$^n$Octyl$_2$MeNH][R'CB$_{11}$Cl$_{11}$]

In a 50 mL Schlenk flask, a solution of 300 mg Na[R'CB$_{11}$Cl$_{11}$] in 10 mL THF was added to a solution of 1.1 equiv [$^n$Octyl$_2$MeNH]Cl in 10 mL THF. Upon mixing, precipitate formed immediately. The mixture was further stirred for 2 h, then filtered through a short pad of Celite. The filtrate was concentrated in vacuo, and the resulting oil was dissolved in toluene. The toluene solution was passed through a short pad of silica gel (to remove excess [$^n$Octyl$_2$MeNH]Cl) and concentrated under vacuum to afford the product.

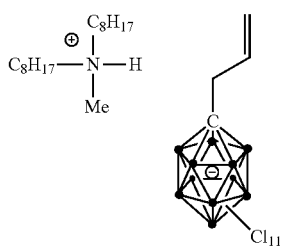

["Octyl₂MeNH][Allyl-CB₁₁Cl₁₁]: 360 mg (78%). ¹H NMR (500 MHz, CDCl₃): δ 6.16 (ddt, J=17.2, 9.9, 7.4 Hz, 1H), 5.20 (dq, J=16.7, 1.4 Hz, 1H), 5.12 (dq, J=16.7, 1.4 Hz, 1H), 3.01 (d, J=7.3 Hz, 3H), 3.15 (vt, J=7.5 Hz, 4H), 3.08 (d, J=7.4 Hz, 2H), 2.97 (s, 3H), 1.80 (p, J=8.0 Hz, 4H), 1.44-1.21 (m, 22H), 0.89 (t, J=7.0 Hz, 3H). ¹¹B{¹H} NMR (128 MHz, CDCl₃): δ −3.53, −10.47, −11.75. ¹³C{¹H} NMR (126 MHz, CD₃CN): δ 137.6 (s, CHCH₂, 1C), 116.5 (s, CHCH₂, 1C), 57.1 (s, alpha-CH₂, 2C), 54.0 (brs, carborane-C, 1C), 40.8 (s, N-Me, 1C), 32.3 (s, CH₂, 2C), 29.6 (s, CH₂, 2C), 29.5 (s, CH₂CHCH₂, 1C), 26.9 (s, CH₂, 2C), 24.5 (s, CH₂, 2C), 23.3 (s, CH₂, 2C), 14.4 (s, terminal-Me, 2C).

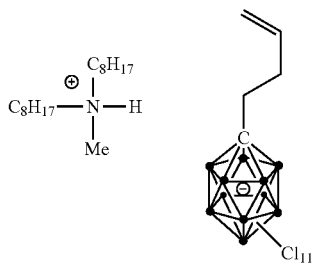

["Octyl₂MeNH][Butenyl-CB₁₁Cl₁₁]: 360 mg (80%). ¹H NMR (500 MHz, CDCl₃): δ 6.16 (ddt, J=17.2, 9.9, 7.4 Hz, 1H), 5.20 (dq, J=16.7, 1.4 Hz, 1H), 5.12 (dq, J=16.7, 1.4 Hz, 1H), 3.01 (d, J=7.3 Hz, 3H), 3.15 (vt, J=7.5 Hz, 4H), 3.08 (d, J=7.4 Hz, 2H), 2.97 (s, 3H), 1.80 (p, J=8.0 Hz, 4H), 1.44-1.21 (m, 22H), 0.89 (t, J=7.0 Hz, 3H). ¹¹B{¹H} NMR (128 MHz, CDCl₃): δ −3.81, −10.58, −11.80. ¹³C{¹H} NMR (126 MHz, CDCl₃): δ 136.5 (s, CHCH₂, 1C), 116.1 (s, CHCH₂, 1C), 57.7 (s, alpha-CH₂, 2C), 50.4 (brs, carborane-C, 1C), 41.5 (s, N-Me), 31.5 (s, CH₂, 2C), 30.4 (s, CH₂CH₂CHCH₂, 1C), 28.9 (s, CH₂, 2C), 28.7 (s, CH₂CH₂CHCH₂, 1C), 26.2 (s, CH₂, 2C), 24.5 (s, CH₂, 2C), 22.5 (s, CH₂, 2C), 14.0 (s, terminal CH₃, 2C).

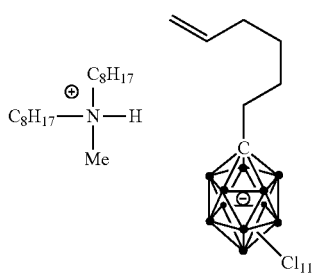

["Octyl₂MeNH][Hexenyl-CB₁₁Cl₁₁]: 410 mg (85%). ¹H NMR (500 MHz, CDCl₃): δ 7.04 (s, 1H), 5.77 (ddt, J=17.0, 10.2, 6.7 Hz, 1H), 5.00 (dq, J=17.5, 3.3 Hz, 1H), 4.94 (dq, J=17.5, 3.3 Hz, 1H), 3.12 (t, J=8.3 Hz, 4H), 2.93 (s, 3H), 2.28 (t, J=9.0 Hz, 2H), 2.05 (dd, J=14.7, 6.9 Hz, 2H), 1.96-1.85 (m, 2H), 1.84-1.73 (m, 2H), 1.45-1.20 (m, 24H), 0.88 (t, J=6.9 Hz, 6H). ¹¹B{¹H} NMR (128 MHz, CDCl₃): δ −3.61, −10.39, −11.70. ¹³C{¹H} NMR (126 MHz, CDCl₃): δ 138.1 (s, CHCH₂, 1C), 114.8 (s, CHCH₂, 1C), 57.8 (s, alpha-CH₂, 2C), 51.1 (brs, carborane-C, 1C), 41.6 (s, N-Me), 33.0 (s, hexyl-CH₂, 1C), 31.6 (s, CH₂, 2C), 31.0 (s, hexyl-CH₂, 1C), 29.4 (s, hexyl-CH₂, 1C), 28.9 (s, CH₂, 2C), 26.3 (s, CH₂, 2C), 24.6 (s, CH₂, 2C), 23.9 (s, hexyl-CH₂, 1C), 22.6 (s, CH₂, 2C), 14.1 (s, terminal CH₃, 2C).

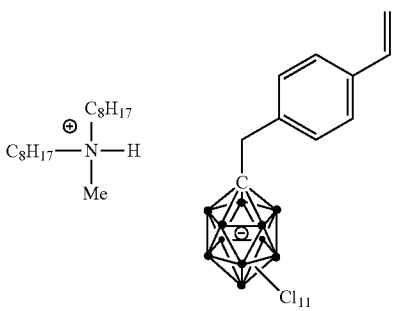

["Octyl₂MeNH][CH₂=CHC₆H₄CH₂CB₁₁Cl₁₁]: 500 mg (82%). ¹H NMR (500 MHz, CDCl₃) δ 7.46 (d, J=8.3 Hz, 2H), 7.25 (d, J=8.3 Hz, 2H), 6.67 (dd, J=17.7, 10.8 Hz, 1H), 5.73 (d, J=17.6 Hz, 1H), 5.23 (d, J=10.9 Hz, 1H), 3.67 (s, 2H), 3.15 (t, J=8.4 Hz, 4H), 2.97 (s, 3H), 1.84-1.71 (m, 4H), 1.43-1.18 (m, 22H), 0.88 (t, J=7.0 Hz, 6H). ¹¹B{¹H} NMR (128 MHz, CDCl₃): δ −3.18, −10.42, −11.78. ¹³C{¹H} NMR (126 MHz, CDCl₃/CD₃CN) δ 137.6 (s, sp²-C, 1C), 137.2 (s, sp²-C, 1C), 134.9 (s, Ar, 1C), 131.2 (s, Ar, 1C), 125.5 (s, Ar, 1C), 114.5 (s, Ar, 1C), 57.0 (s, N—CH₂, 2C), 49.5 (brs, carborane-C, 1C), 40.7 (s, N-Me, 1C), 36.2 (s, benzylic-C, 1C), 32.2 (s, CH₂, 2C), 29.5 (s, CH₂, 4C), 26.9 (s, CH₂, 2C), 24.4 (s, CH₂, 2C), 23.2 (s, CH₂, 2C), 14.3 (s, CH₂, 2C).

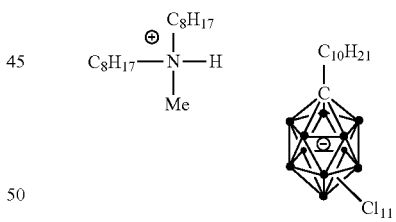

["Octyl₂MeNH][Decyl-CB₁₁Cl₁₁]: 400 mg (88%). ¹H NMR (500 MHz, C₆D₆) δ 4.67 (s, 1H), 2.76 (t, J=8.4 Hz, 2H), 2.33-2.17 (m, 4H), 2.10-2.00 (m, 2H), 1.90 (d, J=5.5 Hz, 3H), 1.42-1.33 (m, 4H), 1.33-1.06 (m, 30H), 0.99 (t, J=7.2 Hz, 6H), 0.90 (t, J=7.0 Hz, 3H). ¹¹B{¹H} NMR (128 MHz, CDCl₃): δ −3.09, −10.04, −11.72. ¹³C{¹H} NMR (100 MHz, CD₃CN) δ 57.3 (s, alpha-CH₂, 2C), 51.5 (brs, carborane-C, 1C), 41.0 (s, N-Me), 32.6 (s, decyl-alpha-CH₂, 1C), 32.4 (s, CH₂, 2C), 32.0 (s, decyl-CH₂, 1C), 30.6 (s, decyl-CH₂, 1C), 30.1 (s, decyl-CH₂, 1C), 30.0 (s, decyl-CH₂, 1C), 29.9 (s, decyl-CH₂, 1C), 29.7 (s, CH₂, 2C), 29.6 (s, CH₂, 2C), 29.4 (s, decyl-CH₂, 1C), 27.0 (s, CH₂, 2C), 25.1 (s, decyl-CH₂, 1C), 24.8 (s, CH₂, 2C), 23.4 (s, decyl-CH₂, 1C), 23.3 (s, CH₂, 2C), 14.4 (s, terminal CH₃, 3C).

Example 3—General Synthesis of [($^n$C$_{18}$H$_{37}$)$_2$MeNH][R'CB$_{11}$Cl$_{11}$]

In a 50 mL Schlenk flask, a solution of 300 mg Na[R'CB$_{11}$Cl$_{11}$] in 10 mL THF was added to a solution of 1.1 equiv [($^n$C$_{18}$H$_{37}$)$_2$MeNH]Cl in 10 mL THF. Upon mixing, precipitate formed immediately. The mixture was further stirred for 2 h, then filtered through a short pad of Celite. The filtrate was concentrated under vacuum, and the resulting oil was dissolved in toluene. The toluene solution was passed through a short pad of silica gel (to remove excess [($^n$C$_{18}$H$_{37}$)$_2$MeNH]Cl) and concentrated under vacuum to afford the product. Each of the following examples/products were characterized by H$^1$ NMR and C$^{13}$ NMR.

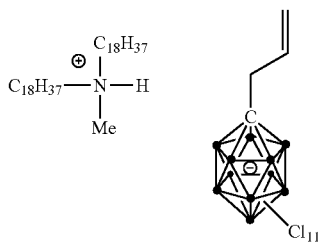

[($^n$C$_{18}$H$_{37}$)$_2$MeNH][Allyl-CB$_{11}$Cl$_{11}$]: 425 mg (85%). $^1$H NMR (500 MHz, C$_6$D$_6$): δ 6.40 (brs, NH), 6.05 (ddt, J=17.2, 9.9, 7.4 Hz, 1H), 5.09 (dq, J=16.7, 1.4 Hz, 1H), 5.02 (dq, J=16.7, 1.4 Hz, 1H), 3.14-2.96 (m, 6H, N—CH$_2$,alpha-CH$_2$), 2.88 (d, J=5.4 Hz, 3H, N—CH$_3$), 1.75-1.66 (m, 4H, CH$_2$), 1.32-1.16 (m, 60H, CH$_2$), 0.78 (t, J=6.9 Hz, 3H, terminal-Me). $^{11}$B{$^1$H} NMR (160 MHz, Toluene-d$_8$): δ −2.74, −9.58, −10.87. $^{13}$C{$^1$H} NMR (126 MHz, acetone-d$_6$): δ 137.6 (s, CHCH$_2$, 1C), 116.5 (s, CHCH$_2$, 1C), 57.1 (s, alpha-CH$_2$, 2C), 54.0 (brs, carborane-C, 1C), 40.9 (s, N-Me), 32.6 (s, CH$_2$, 2C), 30.4-29.6 (m, CH$_2$, 24C), 29.5 (s, CH$_2$CHCH$_2$, 1C), 26.8 (s, CH$_2$, 2C), 24.4 (s, CH$_2$, 2C), 23.3 (s, CH$_2$, 2C), 14.4 (s, terminal CH$_3$, 2C).

[($^n$C$_{18}$H$_{37}$)$_2$MeNH][Butenyl-CB$_{11}$Cl$_{11}$]: 300 mg (85%). $^1$H NMR (500 MHz, CDCl$_3$): δ 5.70 (ddt, J=16.9, 10.2, 6.6 Hz, 1H), 5.06 (dq, J=17.1, 1.5 Hz, 1H), 5.00 (dq, J=10.2, 1.4 Hz, 1H), 3.14-2.96 (m, 6H, N—CH$_2$,alpha-CH$_2$), 2.98 (s, 3H, N—CH$_3$), 2.65-2.60 (m, 2H, hexyl-CH$_2$), 2.35 (t, J=8.9 Hz, 2H, hexyl-CH$_2$), 1.82-1.76 (m, 4H, CH$_2$), 1.41-1.25 (m, 60H, CH$_2$), 0.88 (t, J=7.0 Hz, 3H, terminal-Me). $^{11}$B{$^1$H} NMR (128 MHz, CD$_3$CN): δ −2.87, −9.93, −11.60. $^{13}$C{$^1$H} NMR (126 MHz, CDCl$_3$): δ 138.9 (s, CHCH$_2$, 1C), 116.2 (s, CHCH$_2$, 1C), 57.8 (s, alpha-CH$_2$, 2C), 51.2 (brs, carborane-C, 1C), 41.8 (s, N-Me), 32.0 (s, CH$_2$, 2C), 30.6 (s, CH$_2$CH$_2$CHCH$_2$, 1C), 30.4-29.6 (m, CH$_2$, 24C), 28.9 (s, CH$_2$CHCH$_2$, 1C), 26.5 (s, CH$_2$, 2C), 24.5 (s, CH$_2$, 2C), 22.8 (s, CH$_2$, 2C), 14.3 (s, terminal CH$_3$, 2C).

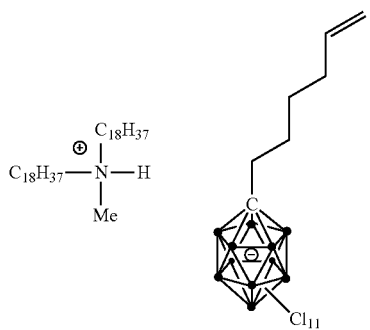

[($^n$C$_{18}$H$_{37}$)$_2$MeNH][Hexenyl-CB$_{11}$Cl$_{11}$]: 300 mg (83%). $^1$H NMR (500 MHz, CDCl$_3$): δ 6.19 (brs, NH), 5.77 (ddt, J=16.9, 10.2, 6.7 Hz, 1H), 5.00 (dq, J=17.1, 1.6 Hz, 1H), 4.94 (dq, J=10.2, 1.2 Hz, 1H), 3.25-3.08 (m, 6H, N—CH$_2$, alpha-CH$_2$), 2.99 (d, J=4.9 Hz, 3H, N—CH$_3$), 2.29 (vt, J=9.6 Hz, 2H, alpha C of hexyl), 2.05 (qt, J=6.8, 1.3 Hz, 2H, hexyl-CH$_2$), 1.93-1.77 (m, 6H, CH$_2$), 1.32-1.16 (m, 62H, CH$_2$), 0.88 (t, J=7.0 Hz, 3H, terminal-Me). $^{11}$B{$^1$H} NMR (128 MHz, CD$_3$CN): δ −2.97, −9.99, −11.62. $^{13}$C{$^1$H} NMR (126 MHz, CDCl$_3$): δ $^{13}$C{$^1$H} NMR (126 MHz, CDCl$_3$): δ 138.4 (s, CHCH$_2$, 1C), 114.9 (s, CHCH$_2$, 1C), 57.9 (s, alpha-CH$_2$, 2C), 51.7 (brs, carborane-C, 1C), 41.9 (s, N-Me), 33.2 (s, hexyl-CH$_2$, 1C), 32.1 (s, CH$_2$, 2C), 31.2 (s, hexyl-CH$_2$, 1C), 30.4-29.6 (m, CH$_2$, 24C), 29.6 (s, hexyl-CH$_2$, 1C), 26.4 (s, CH$_2$, 2C), 24.5 (s, CH$_2$, 2C), 24.0 (s, hexyl-CH$_2$, 1C), 22.8 (s, CH$_2$, 2C), 14.3 (s, terminal CH$_3$, 2C).

[($^n$C$_{18}$H$_{37}$)$_2$MeNH][Styrenyl-CB$_{11}$Cl$_{11}$]: 330 mg (82%). $^1$H NMR (400 MHz, Chloroform-d) δ 7.47 (d, J=8.1 Hz, 2H), 7.24 (d, J=8.1 Hz, 2H), 6.66 (dd, J=17.6, 10.9 Hz, 2H), 5.73 (d, J=17.6 Hz, 1H), 5.23 (d, J=10.9 Hz, OH), 3.67 (s, 2H), 3.24-2.93 (m, 4H), 2.86 (d, J=5.1 Hz, 3H, N-Me), 1.35-1.26 (m, CH$_2$60H), 0.88 (t, J=6.8 Hz, 6H). $^{11}$B{$^1$H} NMR (128 MHz, CD$_3$CN): δ −2.70, −9.95, −11.35. $^{13}$C{$^1$H} NMR (126 MHz, CDCl$_3$): δ 136.8 (s, CHCH$_2$, 1C), 136.5 (s, Ar, 1C), 134.1 (s, Ar, 2C), 130.2 (s, Ar, 1C), 124.9 (s, Ar, 2C), 114.0 (s, CHCH$_2$, 1C), 57.5 (s, alpha-CH$_2$, 2C), 49.2 (brs, carborane-C, 1C), 41.3 (s, N-Me, 1C), 35.6 (s, benzyl-CH$_2$, 1C), 32.0 (s, CH$_2$, 4C), 29.8-29.6 (m, CH$_2$, 22C), 29.5 (s, CH$_2$, 2C), 29.4 (s, CH$_2$, 2C), 29.3 (s, CH$_2$, 2C), 29.0 (s, CH$_2$, 2C), 26.3 (s, CH$_2$, 2C), 24.4 (s, CH$_2$, 2C), 22.7 (s, CH$_2$, 2C), 14.2 (s, terminal CH$_3$, 2C).

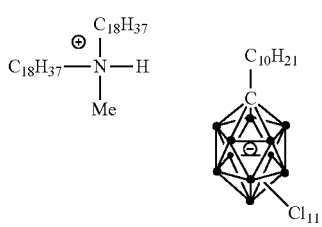

[("C₁₈H₃₇)₂MeNH][Decyl-CB₁₁Cl₁₁]: 340 mg (80%). $^1$H NMR (400 MHz, Chloroform-d) δ 6.16 (brs, N—H, 1H), 3.27-3.08 (m, N—CH$_2$, 4H), 2.99 (d, J=5.2 Hz, N-Me, 3H), 2.28-2.24 (m, alpha-decyl-CH$_2$, 2H), 1.87-1.74 (m, CH$_2$, 6H), 1.41-1.26 (m, CH$_2$, 76H), 0.87 (t, J=6.7 Hz, terminal-CH$_3$, 9H). $^{11}$B{$^1$H} NMR (128 MHz, CD$_3$CN): δ −3.22, −10.05, −11.38. $^{13}$C{$^1$H} NMR (126 MHz, CDCl$_3$): δ 58.1 (s, alpha-CH$_2$, 2C), 51.5 (brs, carborane-C, 1C), 41.9 (s, N-Me, 1C), 32.01 (s, N-alkyl-CH$_2$, 2C) 31.96 (s, decyl-CH$_2$, 1C), 31.3 (s, decyl-CH$_2$, 1C), 30.3 (s, decyl-CH$_2$, 1C), 29.8-29.3 (m, CH$_2$, 34C), 29.0 (s, CH$_2$, 2C), 26.4 (s, CH$_2$, 2C), 24.7 (s, CH$_2$, 2C), 24.5 (s, decyl-CH$_2$, 2C), 22.77 (s, N-alkyl-CH$_2$, 2C), 22.74 (s, decyl-CH$_2$, 1C), 14.21 (s, N-alkylterminal CH$_3$, 2C), 14.19 (s, decyl-terminal-CH$_3$).

Example 4—Polymerization of 1-Octene

Polyoctene was prepared by mixing Procatalyst 1 and an olefin-substituted Co-Catalyst 1 in 1-octene. The average molecular weight of the polyoctene final product was previously determined to have a Mn of 1449 amu by size exclusion chromatography. In addition to the olefin incorporation, the carborane activator contains eleven boron atoms (black dots in Co-Catalyst 1), eleven chloride atoms, and a fixed negative charge. In order to confirm incorporation of the anion in the polyolefin (polyoctene), mass spectrometry was utilized to analyze the reaction mixture and the additional control.

Figure 2:
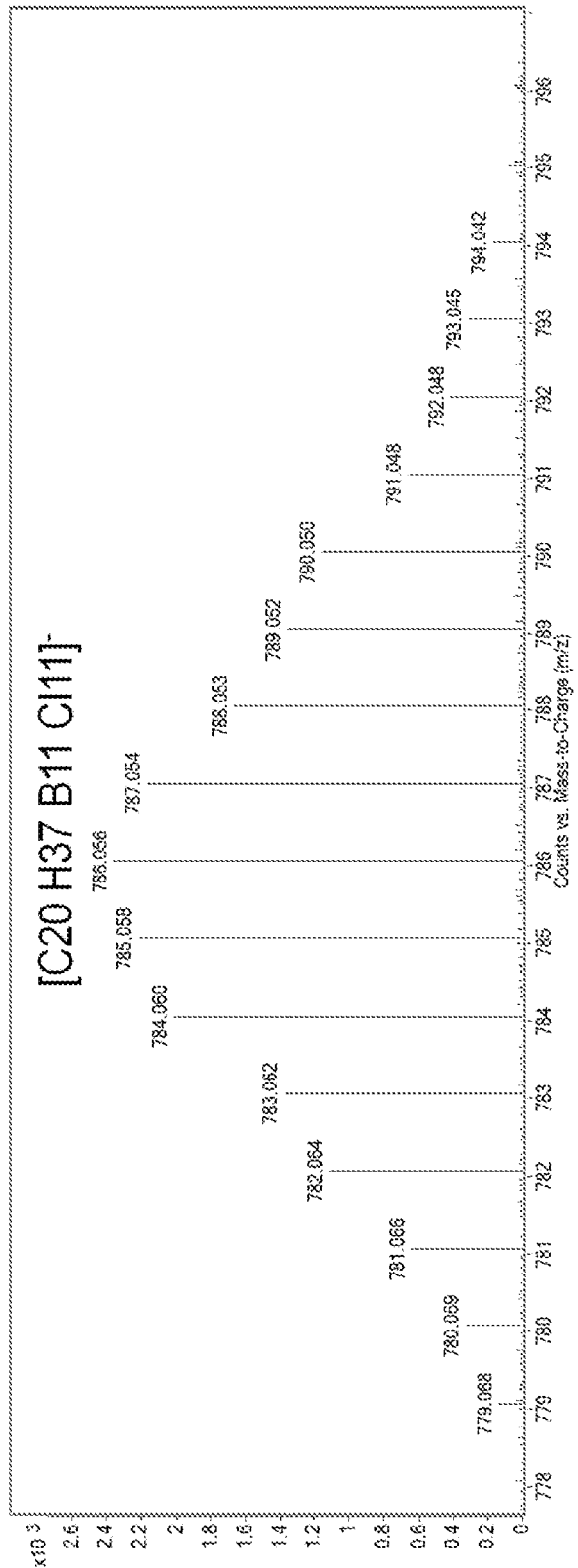
FIG. 2 is an expanded mass spectra of around mass to charge ratio (m/z) of 786.056 from the negative flow injection analysis of the polyoctene produced from procatalyst P1 and olefin-substituted carborane activator Co.-cat. 5.
Figure 3:
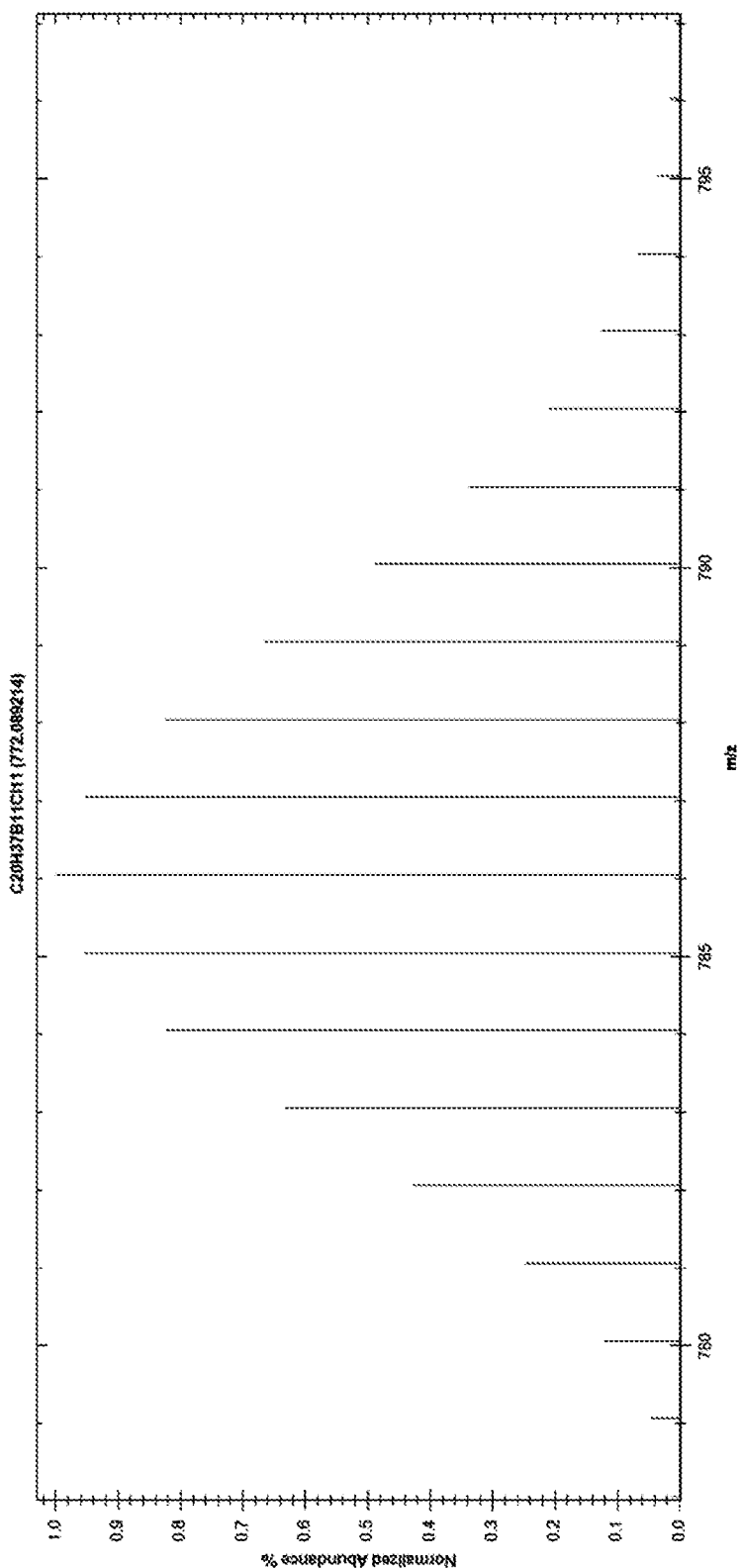
FIG. 3 is a theoretical isotopic modeling of $[C_{20}H_{37}B_{11}Cl_{11}]^-$, the product resulting from the polymerization of the anion from Co-Cat 5 and two 1-octene monomer units, in which activated procatalyst P2 is the catalyst.
Figure 4:
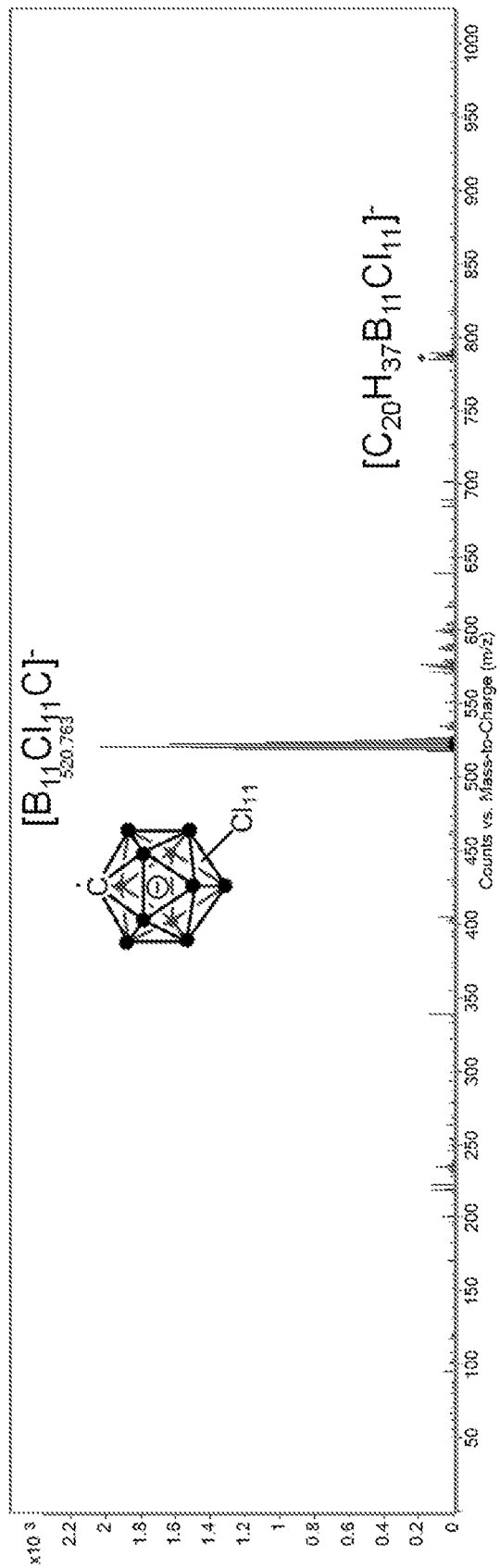
FIG. 4 is a negative mode mass spectrum from the flow injection analysis of the polyoctene produced from catalyst P1 and co-catalyst according to embodiments of this disclosure.
Figure 5:
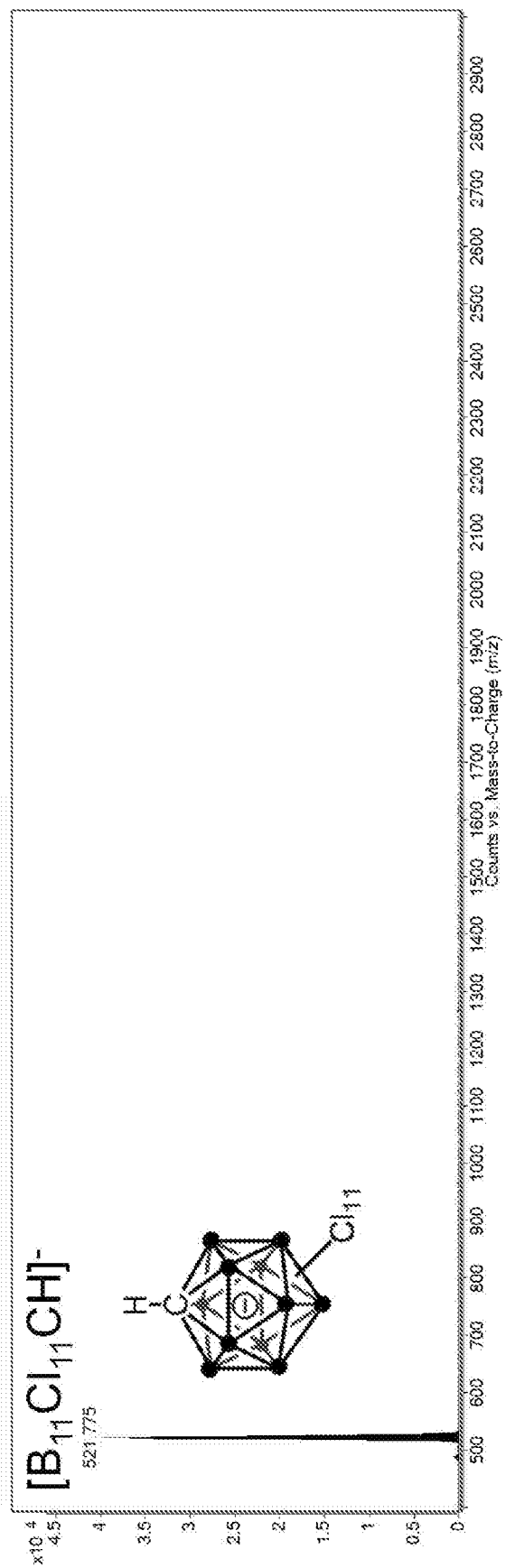
FIG. 5 is a negative mode mass spectrum from the flow injection analysis of the polyoctene produced from catalyst P1 and hydrogen-substituted (no olefin) carborane activator Comp. $C_3$.

The polyoctene produced from catalyst and olefin-substituted carborane activator was subjected to negative mode flow injection mass spectrometry analysis to determine whether incorporation of the carborane into the polyoctene occurred. In FIG. 1, a singly charged distribution of ions were observed with a spacing of m/z 112. Accurate mass analysis of m/z 786.056 (i.e., denoted O₂C in the mass spectrum) was investigated further and consistent with the empirical formula of C$_{20}$H$_{37}$B$_{11}$Cl$_{11}$ (FIG. 2), owning a mass error of 5 mDa. Theoretical isotope modeling of the empirical formula C$_{20}$H$_{37}$B$_{11}$Cl$_{11}$ matched the isotopic profile and relative abundance of the experimental data (FIG. 3). Based on the empirical formula and periodicity of 112 amu, the m/z 786.056 was consistent with the carborane activator polymerized with two octene monomers. Subsequent fragmentation of m/z 786.056 was performed to help confirm the covalent incorporation of the carborane activator. Initial fragmentation conditions were not energetic enough to produce fragment ions (i.e., 35 V), where energies at 70 V were needed to produce fragmentation. Upon fragmentation, homolytic cleavage of the carbon-carbon bond at the boron cage olefin-linker was observed in the spectrum of FIG. 4. This observation along with substantially higher than normal fragmentation conditions suggest that the carborane activator has been covalently incorporated into polyoctene as the intact olefin-containing carborane starting reagent was not observed as a fragment ion. In addition to this peak, the other ion signal in the mass spectrum were investigated. Overall, the m/z 786.056 peak served as a representative example of the other ion signal. Accurate mass analysis, isotope modeling, and fragmentation of the additional ion signal (m/z 890-3100) was consistent with increased polymerization of octene, where up to twenty-two polyoctene chains incorporated with the carborane activator were observed. For comparative purposes, the polyoctene produced from catalyst P1 and hydrogen-substituted (no olefin) carborane activator Comp. C3 (anion having the formula of [B$_{11}$Cl$_{11}$CH]$^-$) was analyzed with the negative mode mass spectrum from the flow injection analysis and the data reporting in FIG. 5. The mass spectrum indicates that Comp. C3 was not incorporated into the polymer chains. The only signal in the mass spectrum in FIG. 5 was the signal that corresponds to the [B$_{11}$Cl$_{11}$CH]$^-$ anion.

Example 5—Polymerization Results

To obtain the data recorded in Table 1, the polymerizations were carried out according to the procedure described in the Polymerization of 1-octene section. To obtain the data presented in Table 2, the polymerization reactions were performed according the procedure in the General Procedure for Ethylene/1-Octene Copolymerization section previously described. The activator efficiency and resulting polymer characteristics were assessed for Co-Catalyst 1-7 each anion in the Co-Catalyst 1-7 had an anion according to formula (I)—and a catalyst (Catalyst 1) presumed to form from a procatalyst according to the bis((phenylphenoxy) structure of the formula (X) (Procatalyst 3, herein "P 3") and two other catalyst as previously described in the disclosure (Procatalyst 1, herein "P 1", and Procatalyst 2, herein "P 2").

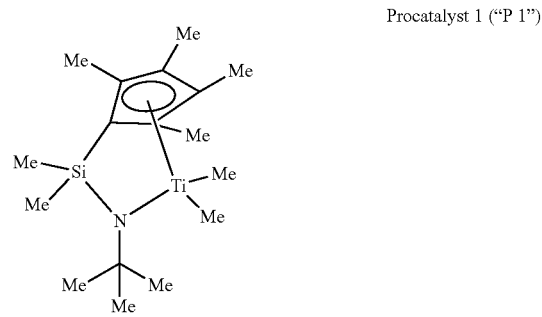

Procatalyst 1 ("P 1")

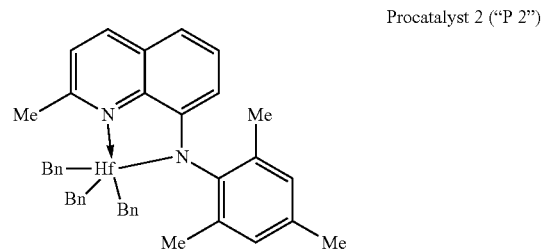

Procatalyst 2 ("P 2")

Procatalyst 3 (P 3)

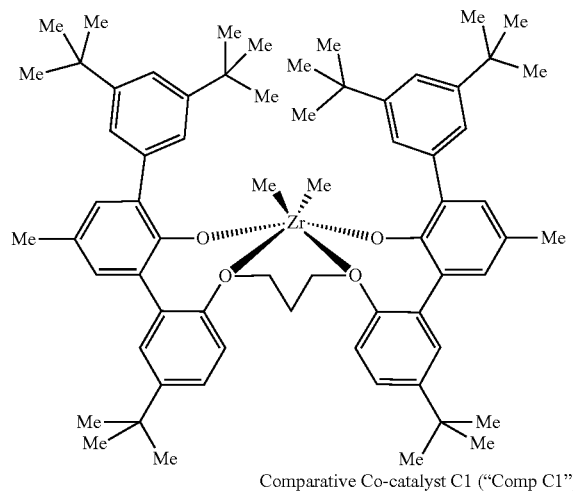

Comparative Co-catalyst C1 ("Comp C1")

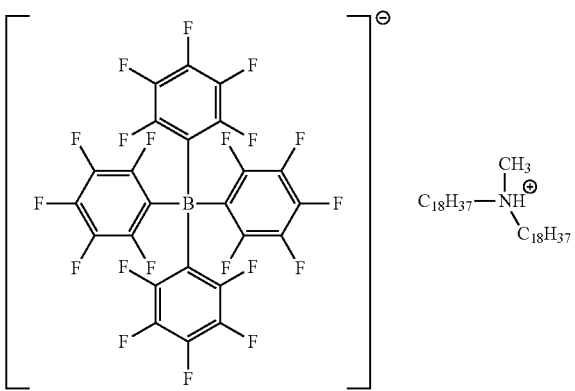

Comparative Co-Catalyst C2 ("Comp C2")

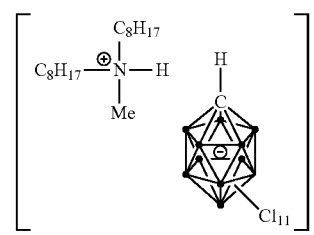

Comparative Co-Catalyst C3 ("Comp C3")

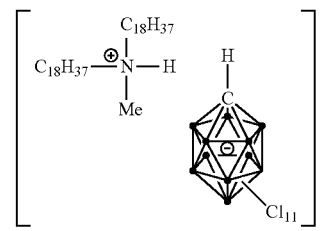

Each of Co-Catalyst 1-7 and Comparative Co-catalysts C1 and Comparative Co-catalysts C2, Comparative Co-catalysts C3, and Comparative Co-catalyst C4 (herein "Comp C1", "Comp C2", "Comp C3", and "Comp C4") were mixed with one of Procatalyst 1, Procatalyst 2, or Procatalyst 3 to form sixteen catalyst systems. Comparative C1 was a compound having a tetrakis(pentafluorophenyl) borate anion and $^+NH(Me)(C_{18}H_{37})_2$ as a countercation. The Comparative C1 has been successfully used in industrial-scale olefin polymerization reactions.

TABLE 1

| | | | | | | Polyoctene Screening | | | | |
|---|---|---|---|---|---|---|---|---|---|---|
| Cat. | Amt Added (μmol) | Activator | Amt Added (μmol) | Equiv. | Yield (g) | Efficiency (g poly./g metal) | Efficiency wrt* to Comp C1 | Mw | Mn | PDI |
| P 1 | 5 | Comp C1 | 6 | 1.2 | 5.81 | 24,260 | 100 | 6,855 | 2,183 | 3.14 |
| P 1 | 5 | Co-Cat. 5 | 6 | 1.2 | 4.34 | 18,131 | 75 | 2,994 | 1,449 | 2.07 |
| P 1 | 5 | Comp. C3 | 6 | 1.2 | 5.27 | 22,013 | 91 | 3,240 | 1,600 | 2.02 |
| P 3 | 2 | Comp C1 | 2.5 | 1.25 | 7.49 | 41,049 | 100 | 402,480 | 117,450 | 3.43 |
| P 3 | 2 | Comp. C2 | 2.5 | 1.25 | 7.38 | 40,449 | 99 | 423,690 | 145,050 | 2.92 |
| P 3 | 2 | Co-Cat. 1 | 2.5 | 1.25 | 7.28 | 39,913 | 97 | 309,470 | 95,830 | 3.23 |
| P 3 | 2 | Co-Cat. 6 | 2.5 | 1.25 | 7.31 | 40,081 | 98 | 443,917 | 180,093 | 2.47 |
| P 3 | 2 | Co-Cat. 7 | 2.5 | 1.25 | 7.42 | 40,686 | 99 | 335,994 | 118,003 | 2.85 |
| P 3 | 2 | Co-Cat. 4 | 2.5 | 1.25 | 7.60 | 41,634 | 101 | 351,949 | 112,266 | 3.14 |
| P 3 | 2 | Co-Cat. 5 | 2.5 | 1.25 | 7.54 | 41,305 | 101 | 357,233 | 127,810 | 2.80 |
| P 3 | 2 | Comp. C3 | 2.5 | 1.25 | 7.75 | 42,477 | 103 | 334,720 | 93,394 | 3.58 |
| P 3 | 2 | Co-Cat. 2 | 2.5 | 1.25 | 7.40 | 40,570 | 99 | 234,592 | 71,467 | 3.28 |
| P 3 | 2 | Co-Cat. 3 | 2.5 | 1.25 | 7.50 | 41,091 | 100 | 386,227 | 152,373 | 2.54 |
| P 2 | 2 | Co-Cat. 7 | 2.5 | 1.25 | 4.02 | 11,261 | 97 | 118,150 | 14,401 | 8.20 |
| P 2 | 2 | CompCl | 2.5 | 1.25 | 4.13 | 11,566 | 100 | 116,394 | 11,738 | 9.92 |

*wrt means "with respect to"

The density of the polymer produced by Co-Catalysts 1-7 were measured at 0.86±0.05 g/cm³.

Figure 6:
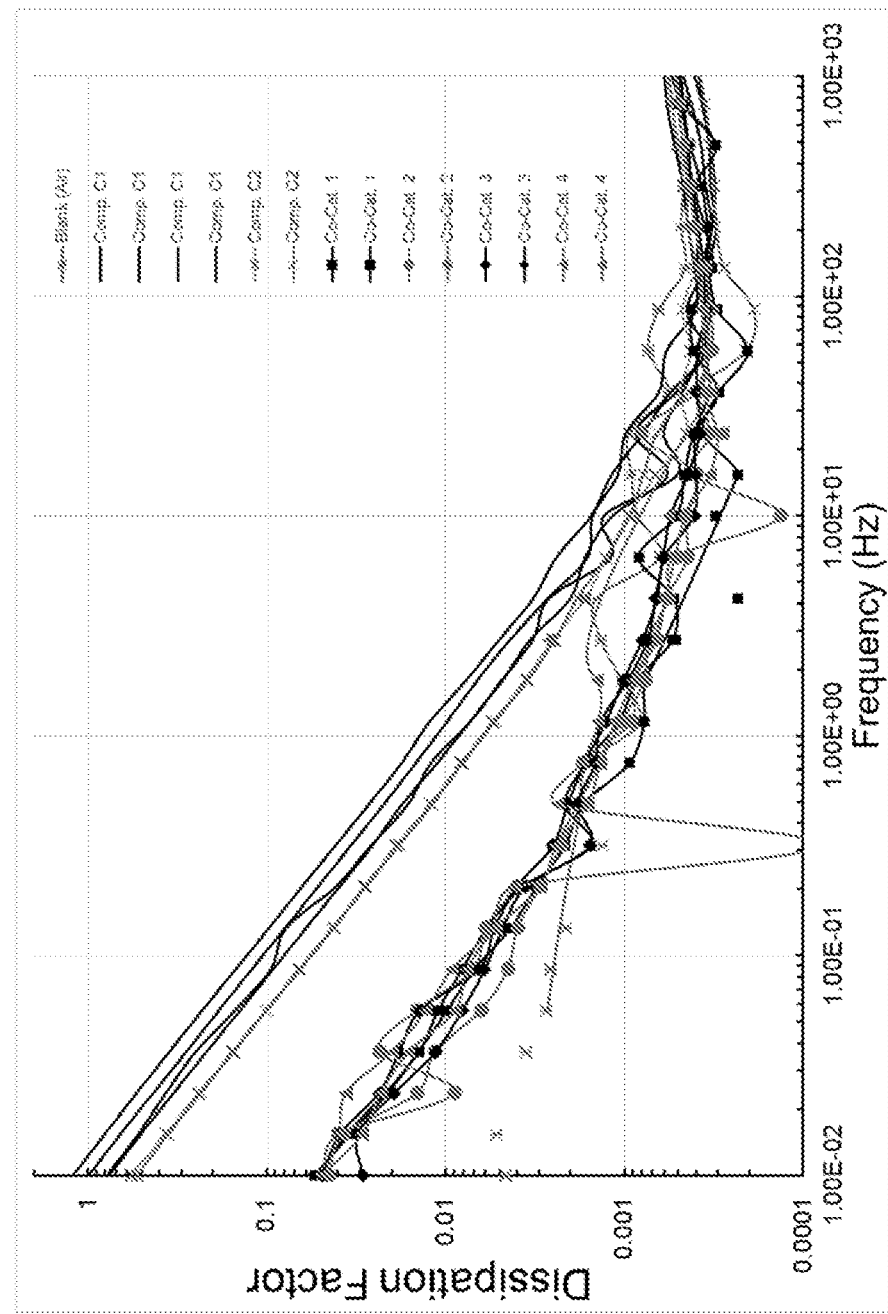
FIG. 6 is a graph of the dissipation factor as a function of frequency for two comparative examples of polyoctene produced from Procatalyst P3 and Comparative Co-Catalysts C1 or C2 and polyoctene produced from Procatalyst P3 and Co-catalysts 1, 2, 3, or 4.
Figure 7:
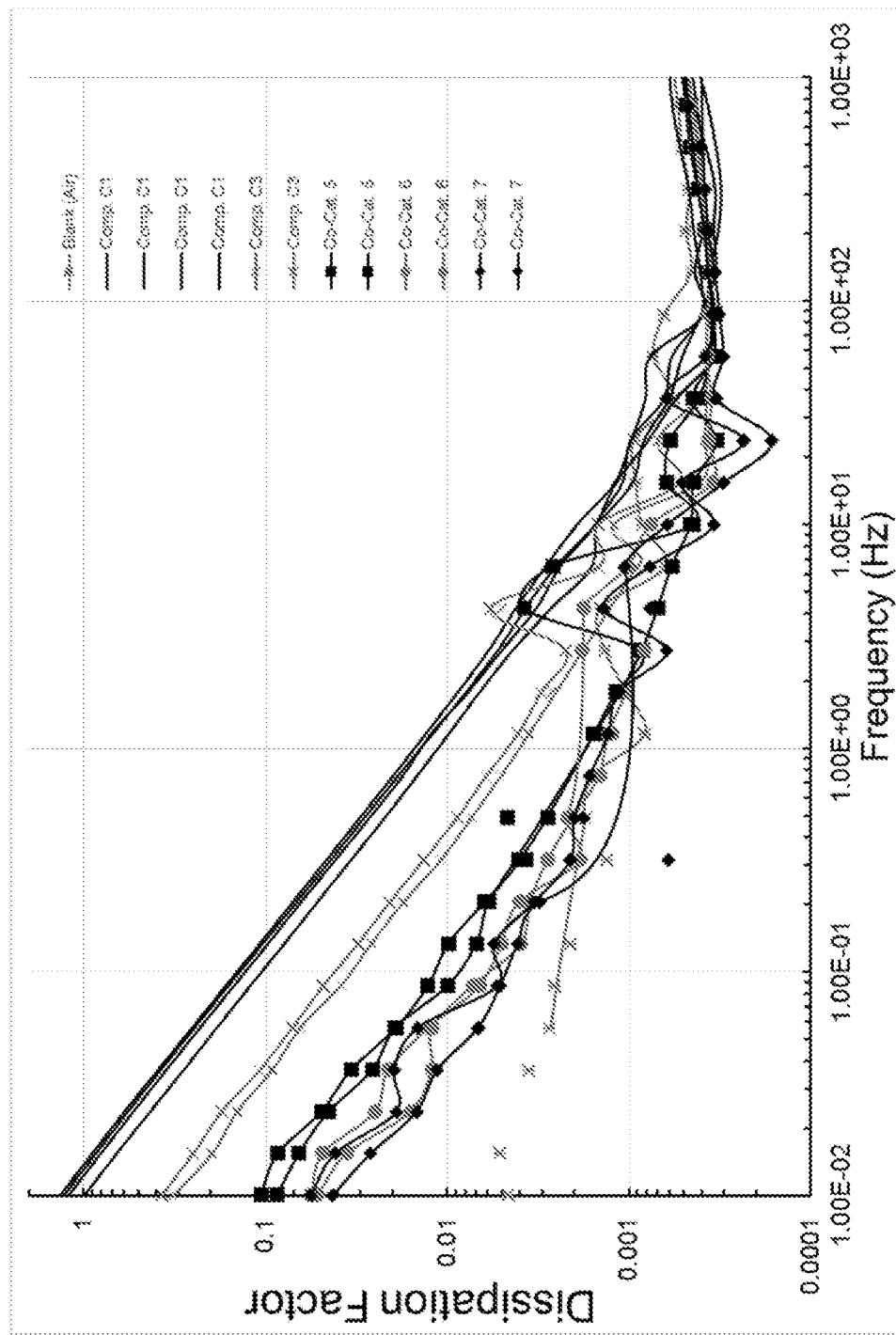
FIG. 7 is a graph of the dissipation factor as a function of frequency for two comparative examples of polyoctene produced from Procatalyst P3 and Comparative Co-Catalysts C1 or C3 and polyoctene produced from Procatalyst P3 and Co-catalysts 5, 6, 7.

To avoid cross-contamination, 1-octene was polymerized in glass vials. This procedure is described in previous paragraphs. The produced polyoctene was measured by broadband dielectric spectroscopy. FIGS. 6 to 9 are graphs of the broadband dielectric spectroscopy. Each polymer produced from the catalyst system exhibit a slope of −1 at low frequencies, suggesting ionic diffusion is the predominant contributor to dissipation factor. The graph of FIG. 6 shows that Comp. C1 and Comp. C2 exhibit similar dissipation factors, whereas the polymers produced from the catalyst system comprising Co-Catalysts 1, 2, 3, and 4 exhibit dissipation factors which are 10 times lower than the comparative co-catalysts. The difference between Comp. C2 and Co-catalysts 1, 2, 3, and 4 are that Co-Catalysts 1, 2, 3, and 4 include a vinyl terminated alkene in the $R^1$ position. Comp. C2 and Co-Catalysts 1, 2, 3, and 4 are of similar size, and therefore, it would be expect if they have similar diffusion rates. Therefore, a decrease of 10 times lower than the comparative co-catalysts suggests that each of Co-Catalysts 1, 2, 3, and 4 have been incorporated into the polyoctene backbone, cannot diffuse freely, and therefore have a lower dissipation factor when compared to the unincorporated Comp. C2.

Dissipation factor testing was performed with a Novocontrol Alpha A dielectric analyzer and a custom sample cell. Samples were measured at room temperature from 0.01 Hz to 1 MHz at 1.5 VAC. Briefly, the sample cell is first measured with dry air to acquire a background measurement. Then the highly viscous polyoctene samples were placed on one of the electrodes with a clean spatula and the test cell was closed. The excess polyoctene was pushed out of the electrodes into adjacent channels as designed. The dissipation factor of the full test cell was then measured. The test cell was then cleaned with toluene and allowed to fully dry before the next measurement. Five different polyoctene samples were provided; three made with Co-Catalyst Comparative C1, one with carborane, and one with allyl-substituted carborane. Each sample was measured at least twice in order to confirm reproducibility.

TABLE 2

Ethylene/Octene Co-polymers Screening

| Catalyst | Amt Added (μmol) | Activator | Amt Added (μmol) | Yield (g) | Efficiency (g poly./g metal) | Mw | Mn | PDI | Mol % Octene | Wt. % Octene |
|---|---|---|---|---|---|---|---|---|---|---|
| P 2 | 1.92 | Co-Cat. 7 | 2.30 | 7.92 | 23,111 | 240,872 | 61,984 | 3.89 | 39.9 | 72.7 |
| P 3 | 0.48 | Co-Cat. 7 | 0.58 | 6.36 | 145,247 | 627,352 | 199,520 | 3.14 | 39.1 | 72.0 |
| P 2 | 1.92 | Comp C3 | 2.30 | 11.45 | 33,411 | 111,480 | 28,970 | 3.85 | 44.9 | 76.5 |
| P 2 | 1.92 | Comp C1 | 2.30 | 15.78 | 46,046 | 82,865 | 21,064 | 3.93 | 49.0 | 79.4 |
| P 3 | 0.48 | Comp C3 | 0.58 | 4.93 | 112,589 | 353,665 | 95,818 | 3.69 | 31.0 | 64.3 |
| P 3 | 0.48 | Comp C1 | 0.58 | 6.61 | 150,956 | 327,024 | 73,127 | 4.47 | 24.2 | 56.1 |

The equivalence of co-catalyst to procatalyst was 1.2.

Figure 8:
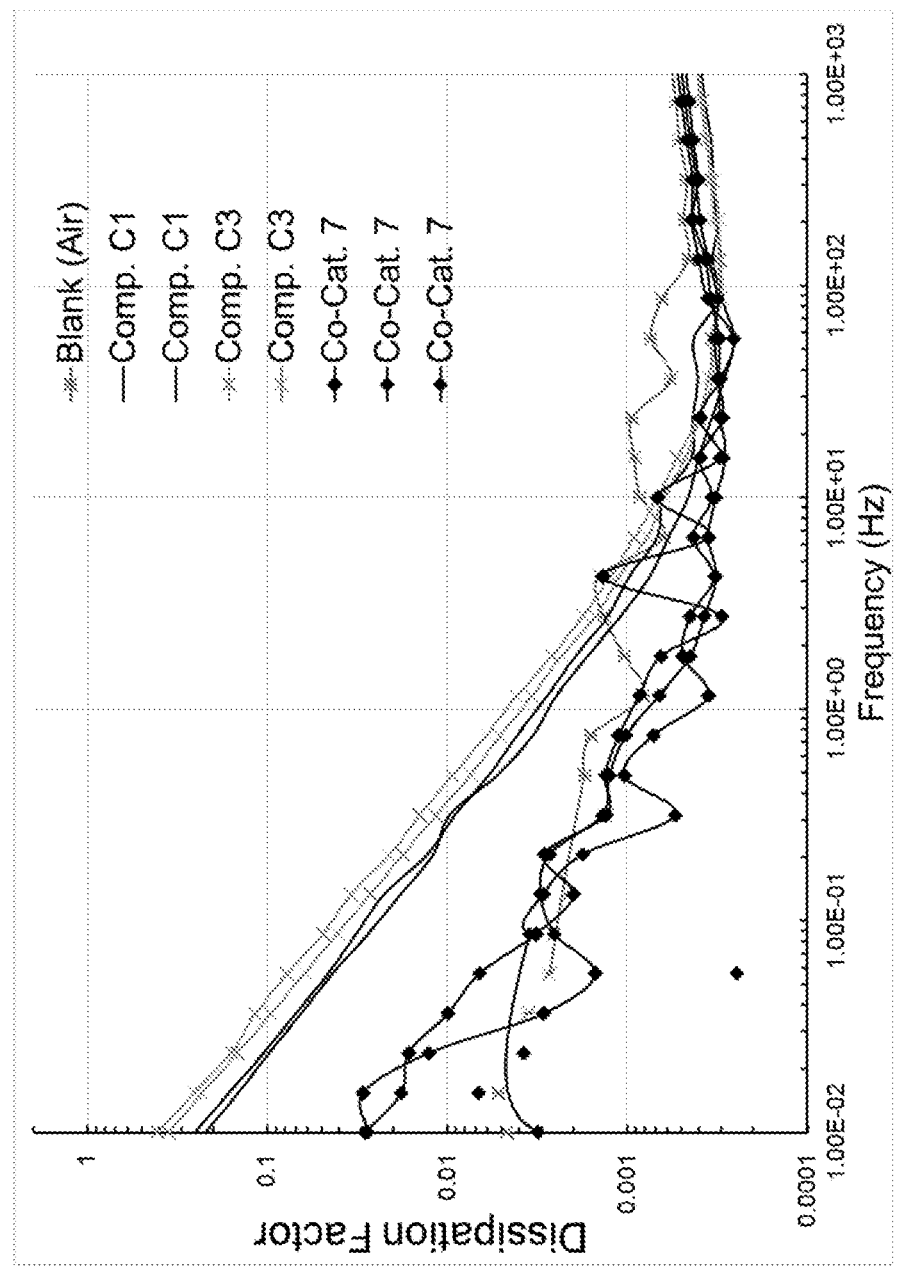
FIG. 8 is a graph of the dissipation factor as a function of frequency for two comparative examples of ethylene-octene copolymer produced from Procatalyst P3 and Comparative Co-Catalysts C1 or C3 and ethylene-octene copolymer produced from Procatalyst P3 and Co-catalyst 7.
Figure 9:
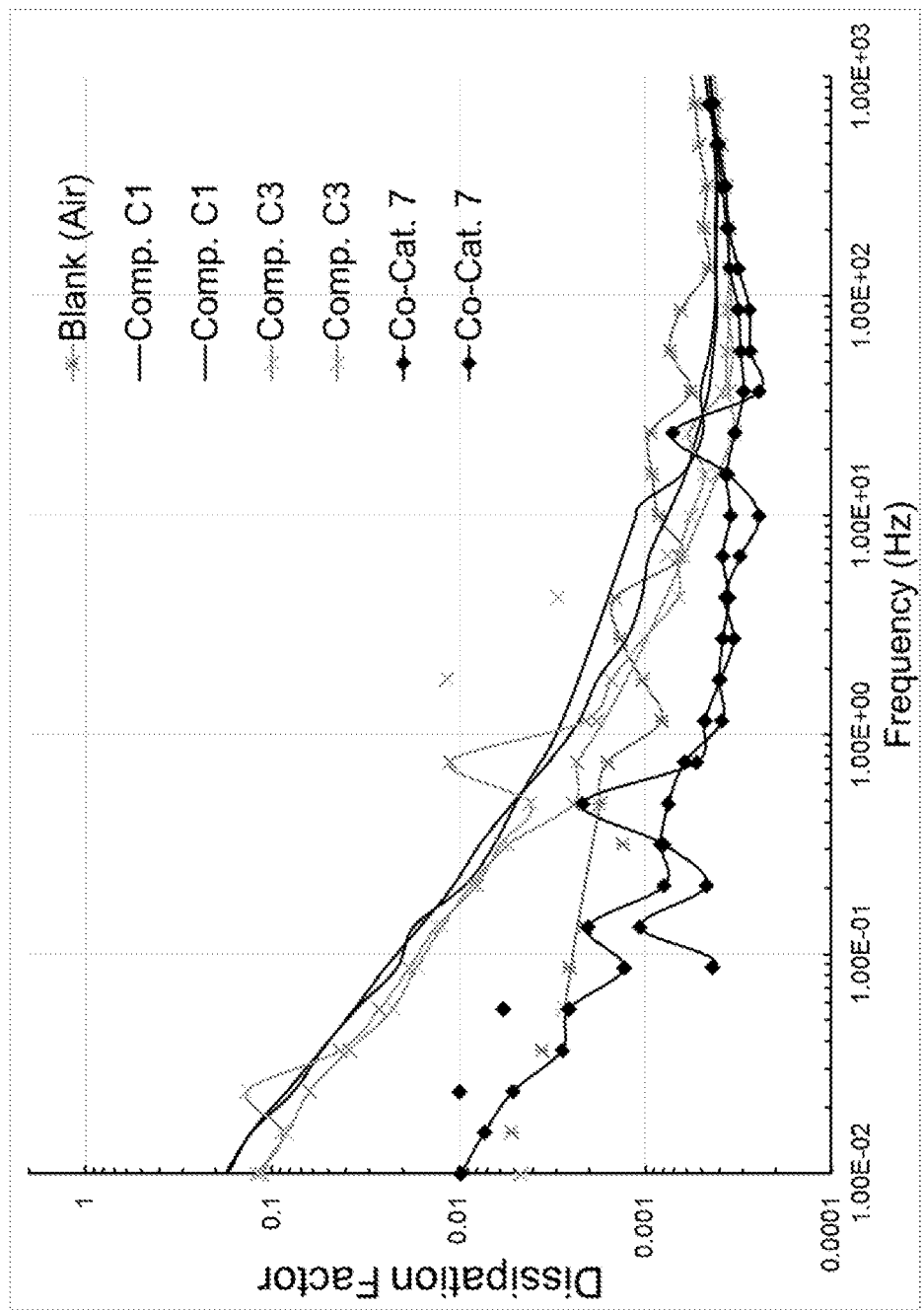
FIG. 9 is a graph of the dissipation factor as a function of frequency for two comparative examples of ethylene-octene copolymer produced from Procatalyst P2 and Comparative Co-Catalysts C1 or C3 and ethylene-octene copolymer produced from Procatalyst P2 and Co-catalyst 7.

The dissipation factor of the ethylene-octene copolymers as recorded in Table 2 were measured and the resulting spectrum is shown in FIGS. 8 and 9. FIG. 8 shows a spectrum of two comparative examples of ethylene-octene copolymer produced from Procatalyst P3 and Comparative Co-Catalysts C1 or C3 and ethylene-octene copolymer produced from Procatalyst P3 and Co-catalyst 7. The dissipation factor of the polymer produced by Co-Catalyst 7 is ten times less than the dissipation factor of FIG. 9 shows a spectrum of two comparative examples of ethylene-octene copolymer produced from Procatalyst P2 and Comparative Co-Catalysts C1 or C3 and ethylene-octene copolymer produced from Procatalyst P2 and Co-catalyst 7. Similar to the dissipation factor of the polymer produced by Co-Catalyst 7 and Procatalyst P3 and shown in FIG. 8, the dissipation factor of the polymer produced by Co-Catalyst 7 and Procatalyst P2 is ten times less than the dissipation factor of the polymer produced by Procatalyst P3 and Comparative Co-Catalysts C1 and the polymer produced by Procatalyst P3 and Comparative Co-Catalysts C3.

The invention claimed is:

1. A polymerization process comprising:
   polymerizing one or more ($C_2$-$C_{12}$)α-olefin monomers in the presence of at least one catalyst and at least one co-catalyst to produce a polyolefin; wherein the co-catalyst comprises a cation and an anion, the anion has a structure according to formula (I):

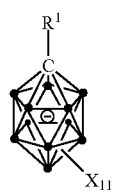

(I)

and an empirical formula of $^-B_{11}CR^1X_{11}$, where $R^1$ is an unsaturated ($C_2$-$C_{20}$) hydrocarbyl having a vinyl terminated alkene; and each X is independently a halogen atom; and
   inserting the anion of the co-catalyst into a polymer chain of the polyolefin.

2. The polymerization process of claim 1, wherein the polyolefin comprises:
   (1) greater than 0 and less than 1 mole % of the anion of the co-catalyst based on the molar composition of the polyolefin, and
   (2) a density in the range from 0.853 to 0.920 g/cm³.

3. The process of claim 1, wherein the polyolefin has a dissipation factor less than that of a corresponding polyolefin composition produced under identical polymeric conditions except the molar amount of the anion of formula (I) is replaced by a comparative anion having the formula (Ia)

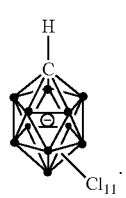

(Ia)

4. The polymerization process of claim 1, wherein the polyolefin comprises greater than 0 mole percent and less than 1 mole percent of the anion of the co-catalyst.

5. The polymerization process of claim 1, wherein $R^1$ has a structure according to formula (III):

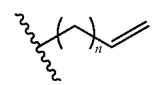

(III)

where n is an integer from 1 to 10.

6. The polymerization process of claim 1, wherein $R^1$ has a structure according to formula (IV):

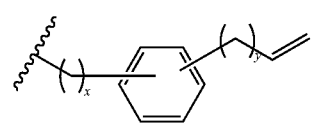

(IV)

where y is an integer from 1 to 10, x is 0, 1, 2, or 3, and where x+y is an integer of from 1 to 12.

7. The polymerization process of claim 6, wherein $R^1$ has a structure according to formula (V):

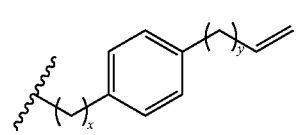

(V)

where y and x are as defined in claim 6.

8. The polymerization process of claim 1, wherein the polyolefin has a dissipation factor of less than 0.10 at a frequency of 100 Hz and a temperature of 130° C. or the polyolefin has a dissipation factor of less than 1.00 at a frequency of 10 Hz and a temperature of 130° C.

9. The polymerization process of claim 1, wherein the polyolefin has a dissipation factor of less than 10 at a frequency of 1.0 Hz and a temperature of 130° C. or the ethylene-based polymer has a dissipation factor of less than 100 at a frequency of 0.10 Hz and a temperature of 130° C.

10. The polymerization process of claim 1, wherein the cation of the co-catalyst is $^+N(H)R^N_3$, where each $R^N$ is chosen from ($C_1$-$C_{20}$)alkyl or ($C_6$-$C_{20}$)aryl.

11. The polymerization process of claim 1, wherein the cation of the co-catalyst is $^+N(H)R^N_3$, where at least two $R^N$ are chosen from ($C_{10}$-$C_{20}$)alkyl.

12. The polymerization process of claim 1, wherein the cation of the co-catalyst is $^+C(C_6H_5)_3$.

13. The polymerization process of claim 1, wherein the cation of the co-catalyst is $^+C(C_6H_4R^C)_3$, where $R^C$ is ($C_1$-$C_{20}$)alkyl.

14. The polymerization process of claim 1, wherein the polyolefin is a polyethylene, polyoctene, or an ethylene-based copolymer.

15. The polymerization process of claim 1, wherein each X is a chlorine atom.

* * * * *